United States Patent
Ogawa et al.

(10) Patent No.: US 11,853,102 B2
(45) Date of Patent: Dec. 26, 2023

(54) REMOTE CONTROL SYSTEM, REMOTE CONTROL METHOD, AND NON-TRANSITORY INFORMATION RECORDING MEDIUM

(71) Applicant: Passlogy Co., Ltd., Tokyo (JP)

(72) Inventors: Hideharu Ogawa, Tokyo (JP); Yasutaka Yamamoto, Tokyo (JP); Yuta Isomura, Tokyo (JP)

(73) Assignee: Passlogy Co., Ltd., Tokyo (JP)

( * ) Notice: Subject to any disclaimer, the term of this patent is extended or adjusted under 35 U.S.C. 154(b) by 355 days.

(21) Appl. No.: 17/418,134

(22) PCT Filed: Dec. 25, 2018

(86) PCT No.: PCT/JP2018/047647
§ 371 (c)(1),
(2) Date: Jun. 24, 2021

(87) PCT Pub. No.: WO2020/136722
PCT Pub. Date: Jul. 2, 2020

(65) Prior Publication Data
US 2022/0107822 A1    Apr. 7, 2022

(51) Int. Cl.
*G06F 21/60* (2013.01)
*G06F 9/451* (2018.01)
(Continued)

(52) U.S. Cl.
CPC ............ *G06F 9/452* (2018.02); *G06F 3/1462* (2013.01); *G06F 16/951* (2019.01); *G06F 21/602* (2013.01)

(58) Field of Classification Search
CPC ...... G06F 9/452; G06F 16/951; G06F 3/1462; G06F 21/602
(Continued)

(56) References Cited

U.S. PATENT DOCUMENTS

| 5,428,349 A | 6/1995 | Baker |
| 6,052,785 A | 4/2000 | Lin et al. |

(Continued)

FOREIGN PATENT DOCUMENTS

| CN | 102739612 A | 10/2012 |
| EP | 1475721 A1 | 11/2004 |

(Continued)

OTHER PUBLICATIONS

Conorich et al., Data Security Management: Effective management of UNIX passwords. (2008). Retrieved from the Internet: URL:http://www.ittoday.info/AIMS/DSM/8301101 (retrieved on Oct. 4, 2016).

(Continued)

*Primary Examiner* — Glenford J Madamba
(74) *Attorney, Agent, or Firm* — K&L Gates LLP; Louis C. Cullman; Giorgios N. Kefallinos

(57) ABSTRACT

In a remote control system (101), a terminal (121) waits for an instruction to be transmitted from a mediation device (111) by a browser, a virtual desktop, or the like. A remote controller (131) sends, to the mediation device (111), identification information that identifies the terminal (121) to be controlled and a service to be received by that terminal (121). If the terminal (121) identified by the sent identification information is waiting, the mediation device (111) transmits, to the waiting terminal (121), an instruction specifying the service identified by the sent identification information. The waiting terminal (121) sends, to a server (171) related to the service specified in the transmitted instruction, a request related to the service specified in the transmitted instruction. Note that it is possible to configure such that the server (171) provides the service after performing a confirmation that the terminal (121) that sends the request is the terminal (121) to be controlled.

24 Claims, 14 Drawing Sheets

(51) Int. Cl.
*G06F 16/951* (2019.01)
*G06F 3/14* (2006.01)

(58) Field of Classification Search
USPC .......................................................... 709/229
See application file for complete search history.

(56) References Cited

U.S. PATENT DOCUMENTS

| | | | |
|---|---|---|---|
| 6,571,336 | B1 | 5/2003 | Smith |
| 7,036,016 | B1 | 4/2006 | Smith |
| 7,363,503 | B2 | 4/2008 | Solioz |
| 8,577,807 | B2 | 11/2013 | Kokumai et al. |
| 9,705,874 | B2 | 7/2017 | Ogawa |
| 10,375,061 | B2 | 8/2019 | Ogawa |
| 10,425,404 | B2 | 9/2019 | Ogawa |
| 2004/0139331 | A1 | 7/2004 | Sanai et al. |
| 2005/0160297 | A1 | 7/2005 | Ogawa |
| 2006/0041759 | A1 | 2/2006 | Kaliski et al. |
| 2006/0230435 | A1 | 10/2006 | Kokumai |
| 2006/0248344 | A1 | 11/2006 | Yang |
| 2007/0089166 | A1 | 4/2007 | Medjitov |
| 2007/0094498 | A1 | 4/2007 | Nystrom et al. |
| 2007/0226784 | A1 | 9/2007 | Ueda et al. |
| 2008/0141362 | A1 | 6/2008 | Torres et al. |
| 2008/0276098 | A1 | 11/2008 | Florencio et al. |
| 2010/0107229 | A1 | 4/2010 | Najafi et al. |
| 2010/0223358 | A1 | 9/2010 | Schneider |
| 2011/0191592 | A1 | 8/2011 | Goertzen |
| 2011/0202981 | A1 | 8/2011 | Tamai et al. |
| 2011/0277021 | A1 | 11/2011 | Ogawa |
| 2013/0191900 | A1 | 7/2013 | Ogawa |
| 2013/0312088 | A1 | 11/2013 | Zhang |
| 2014/0289870 | A1 | 9/2014 | Selander et al. |
| 2015/0128234 | A1 | 5/2015 | Xavier et al. |
| 2015/0326565 | A1 | 11/2015 | Kuang et al. |
| 2019/0132436 | A1* | 5/2019 | Jang ................. H04M 1/72415 |
| 2019/0394185 | A1 | 12/2019 | Ogawa |

FOREIGN PATENT DOCUMENTS

| | | | |
|---|---|---|---|
| JP | 2002-366517 | A | 12/2002 |
| JP | 2003-122721 | A | 4/2003 |
| JP | 2004-280245 | A | 10/2004 |
| JP | 2005-071202 | A | 3/2005 |
| JP | 2006-311529 | A | 11/2006 |
| JP | 2007-108833 | A | 4/2007 |
| JP | 2007-264839 | A | 10/2007 |
| JP | 2008027222 | A | 2/2008 |
| JP | 2008-192173 | A | 8/2008 |
| JP | 2008-234440 | A | 10/2008 |
| JP | 2009181153 | A | 8/2009 |
| JP | 2009-301446 | A | 12/2009 |
| JP | 2011-215753 | A | 10/2011 |
| JP | 2014006798 | A * | 1/2014 |
| JP | 2016206982 | A | 12/2016 |
| JP | 2017017559 | A | 1/2017 |
| KR | 20020083481 | A | 11/2002 |
| KR | 20080062445 | A | 7/2008 |
| WO | 2001/084359 | A2 | 11/2001 |
| WO | 2010/079617 | A1 | 7/2010 |
| WO | 2012/029776 | A1 | 3/2012 |
| WO | 2013/070124 | A1 | 5/2013 |
| WO | 2020/136722 | A1 | 7/2020 |

OTHER PUBLICATIONS

Sasaki et al., Notes on the security for one time password system with password generator server. SCIS 2014, The 31st Symposium on Cryptography and Information Security, Kagoshima, Japan, Jan. 21-24, 2014. The Institute of Electronics, Information and Communication Engineers.
Supplementary European Search Report dated Oct. 19, 2016 for European Patent Application No. 11821792.6.
Supplementary European Search Report dated Mar. 12, 2018 for European Patent Application No. 15840293.3.
International Search Report and Written Opinion, dated Mar. 12, 2019, for International Application No. PCT/JP2018/047647.
Office Action, dated Jul. 8, 2021, for U.S. Appl. No. 16/562,039.

* cited by examiner

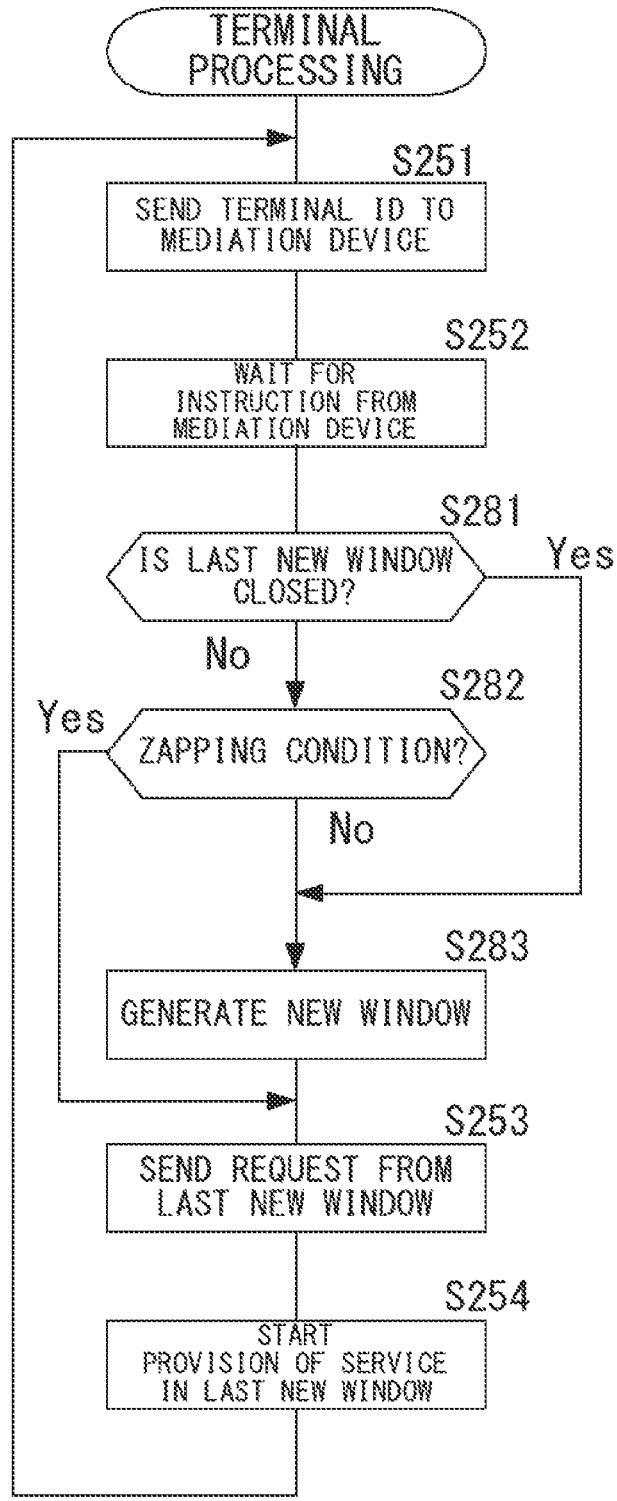

REMOTE CONTROL SYSTEM, REMOTE CONTROL METHOD, AND NON-TRANSITORY INFORMATION RECORDING MEDIUM

CROSS REFERENCE TO RELATED APPLICATION

This application is a national phase filing of PCT/JP2018/047647, filed on Dec. 25, 2018, the entire disclosure of which is incorporated herein by reference.

TECHNICAL FIELD

The present disclosure relates to a remote control system that is suitable for controlling a terminal from a remote controller to receive the provision of a service, a remote control method, a program, and a non-transitory information recording medium.

BACKGROUND ART

In the related art, technology is disclosed in which passwords required to sign-in or log-in to receive the provision of services are managed via a mobile terminal.

For example, Patent Literature 1 discloses technology related to a communication device that divides a password required to receive the provision of a service, stores the divided pieces in position and order elements in a password table that are based on a predetermined selection order, and stores and records random values in the other elements in the password table. According to this technology, provided that the user remembers the selection order, the user does not need to remember the password itself, and the communication device can recover the password and send the password to a server that provides the service on the basis of an input, from the user, corresponding to the selection order.

Meanwhile, when a web service, a virtual desktop service, a remote log-in service, or the like is to be provided to a user via a terminal on which a browser, a virtual desktop client, terminal software, or the like operates, the password or the like for the service is typically input using that terminal.

CITATION LIST

Patent Literature

Patent Literature 1: U.S. Pat. No. 9,705,874

SUMMARY OF INVENTION

Technical Problem

However, when signing in or logging in to a service via a terminal such as a desktop computer, a tablet computer, or the like by using a smartphone or the like owned by the user, there is a demand for being able to sign-in or log-in without inputting the password or the like using that terminal.

Additionally, there are strong demands for reducing cases in which the user is caused to input multiple pieces of personal information during user registration required when first attempting to use the service, and improving the convenience of the user.

In light of such problems, an objective of the present disclosure is to provide a remote control system that is suitable for controlling a terminal from a remote controller to receive a service, a remote control method, a program, and a non-transitory information recording medium.

Solution to Problem

A remote control system according to the present disclosure includes a mediation device, a terminal, and a remote controller.

The terminal waits for an instruction to be transmitted from the mediation device. Meanwhile, the remote controller sends, to the mediation device, identification information that identifies a terminal to be controlled and a service to be received by the terminal.

Furthermore, if the terminal identified by the sent identification information is waiting, the mediation device transmits, to the waiting terminal, an instruction specifying the service identified by the sent identification information.

Moreover, the waiting terminal sends, to a server related to the service specified in the transmitted instruction, a request related to the service specified in the transmitted instruction.

Note that, in the present disclosure, it is possible to configure such that the server provides the service after performing a confirmation that the terminal that sends the request is the terminal to be controlled.

A remote control system according to another aspect of the present disclosure includes a mediation device, a terminal on which a browser operates, and a remote controller.

The browser that operates on the terminal loads a wait page from the mediation device and, as a result, waits for an instruction to be transmitted from the mediation device.

Meanwhile, the remote controller sends, to the mediation device, identification information that identifies a browser to be controlled and a service to be received by that browser.

Furthermore, if the browser identified by the sent identification information is waiting, the mediation device transmits, to the waiting browser, an instruction specifying the service identified by the sent identification information.

Moreover, the waiting browser sends, to a server related to the service specified in the transmitted instruction, a transition request for transitioning to a provision page related to the service specified in the transmitted instruction.

Advantageous Effects of Invention

According to the present disclosure, a remote control system that is suitable for controlling a terminal from a remote controller to receive the provision of a service, a remote control method, a program, and a non-transitory information recording medium can be provided.

BRIEF DESCRIPTION OF DRAWINGS

FIG. 14 is a flowchart illustrating an example of the control flow of processing at a terminal using a zapping condition.

DESCRIPTION OF EMBODIMENTS

Hereinafter, embodiments of the present disclosure are described.

However, the following embodiments are presented for the purpose of explanation and should not be construed as limiting the scope of the invention of the present disclosure. Therefore, embodiments in which some elements or all elements of these embodiments are replaced with equivalent elements by one skilled in the art can also be employed, and such embodiments are also included within the scope of the present disclosure.

Basic Configuration

Figure 1:
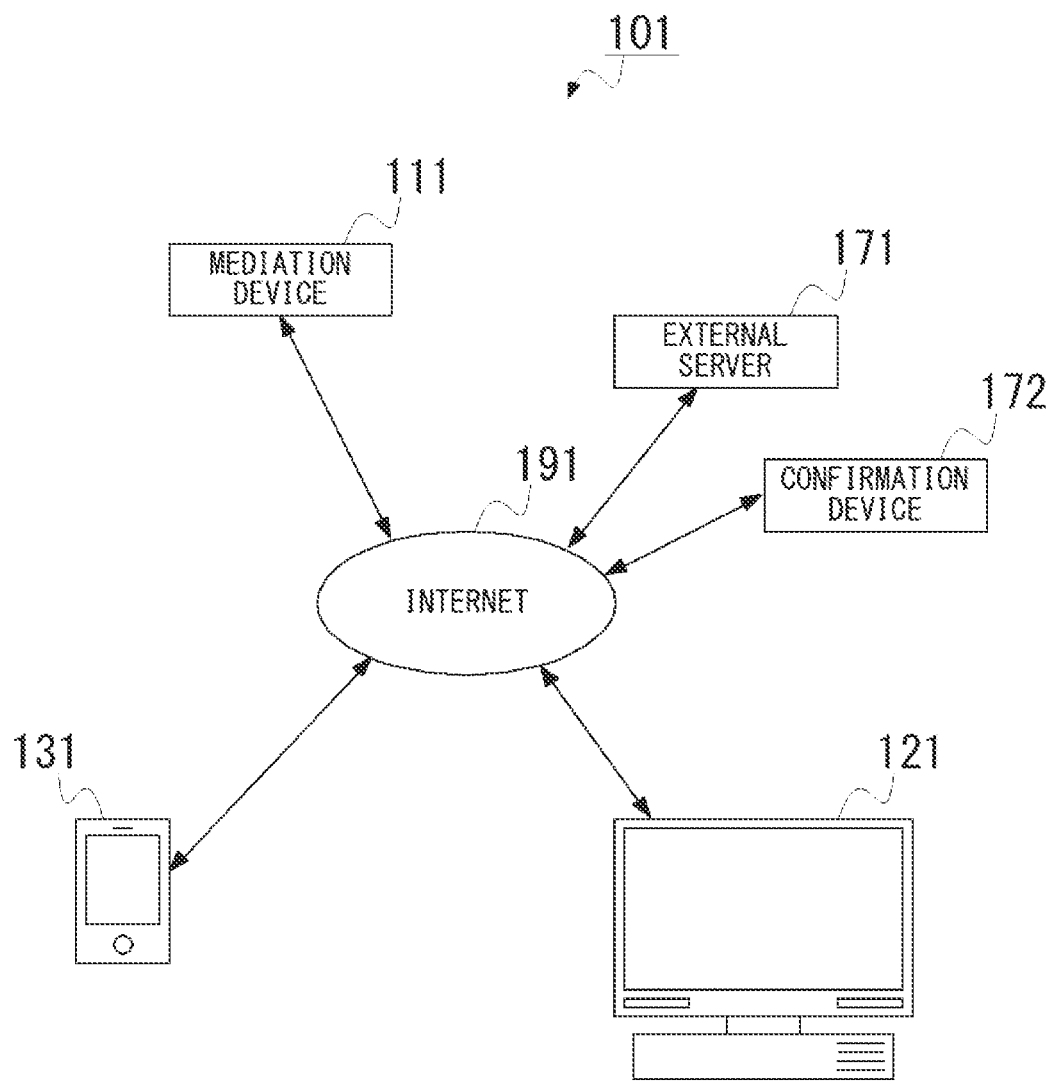
FIG. 1 is an explanatory drawing illustrating the configuration of an embodiment of the present disclosure.

FIG. 1 is an explanatory drawing illustrating the configuration of an embodiment of the present disclosure. Hereinafter, a description is given while referencing FIG. 1.

In a remote control system 101 according to the present embodiment, a remote controller 131 controls the start of receiving, by a browser, a virtual desktop client, a terminal software, or the like operating on a terminal 121, of the provision of a service such as a web service, a virtual desktop service, a remote log-in service, or the like from an external server 171. Note that, according to the present embodiment, it is possible to configure such that it is not necessary to input authentication information such as a password or the like using the terminal 121 when signing-in or logging-in to the service.

Note that the remote control system 101 may include, as an optional element, a confirmation device 172 in order to determine whether to provide the service.

A mediation device 111 carries out mediation for the remote controller 131 to remote control the terminal 121. These devices are communicably connected to each other via an internet 191.

The mediation device 111, the terminal 121, the remote controller 131, the external server 171, and the confirmation device 172 can be realized by executing programs corresponding to the respective functions thereof on various types of computer hardware.

Typically, it is possible to use, as the mediation device 111 and the confirmation device 172, a server computer that executes various processings for cooperating with the remote controller 131 and the like; as the terminal 121, a desktop computer, a notebook computer, or a television device, a game device, or the like that has a browser function; as the remote controller 131, a smartphone; and as the external server 171, a server computer or the like for providing various web services.

In general, a computer reads programs recorded on a non-transitory information recording medium out to random access memory (RAM), which is a temporary storage device and, then, a central processing unit (CPU) or a processor executes an instructions included in the read-out programs. However, in architectures in which the read-only memory (ROM) and the RAM can be mapped to a single memory space and the instructions in the programs can be executed, the instructions in the programs stored in the ROM are read and executed directly by the CPU. The CPU or processor or the like cooperates with the RAM or the like to control a network interface card (NIC), a display, a mouse, a speaker, and other devices of the hardware.

Additionally, each program can be recorded on a non-transitory computer-readable information recording medium such as a compact disk, a flexible disk, a hard disk, a magneto-optical disk, a digital video disk, a magnetic tape, read-only memory (ROM), electrically erasable programmable ROM (EEPROM), flash memory, and semiconductor memory. This non-transitory information recording medium can be distributed and sold independent from the various hardware.

Additionally, these programs can be appropriately recorded individually on a plurality of non-transitory information recording media, the plurality of non-transitory information recording media can be bundled into a media set, and that media set can be distributed and sold independent from the various hardware.

Furthermore, the programs can be distributed from a distribution device or the like to the various hardware via a transitory transmission medium such as a computer communication network, independent from the computer on which the programs are to be executed. For example, when using a smartphone as the computer, the programs can be distributed and sold in an application store for that smartphone.

In addition, when the mediation device 111 is a web server and various pages are loaded in a browser from that web server, the computer on which the browser operates can download and execute the programs in a script format specified by that page.

Note that the programs can be written in a programming language for describing the operating levels of electronic circuits. In such a case, various design diagrams such as a timing chart and a wiring diagram of the electronic circuits can be generated from the programs, and an electronic circuit that constitutes the devices described above can be created on the basis of the design diagrams. For example, based on the programs described above, it is possible to form the image processing device described above on reprogrammable hardware using field programmable gate array (FPGA) technology and, also, it is possible to form an electronic circuit that is dedicated to a specific-application using application specific integrated circuit (ASIC) technology.

In such a case, each of the mediation device 111, the terminal 121, the remote controller 131, the external server 171, and the confirmation device 172 is configured so as to execute processing assigned thereto.

Basic Configuration

Figure 2:
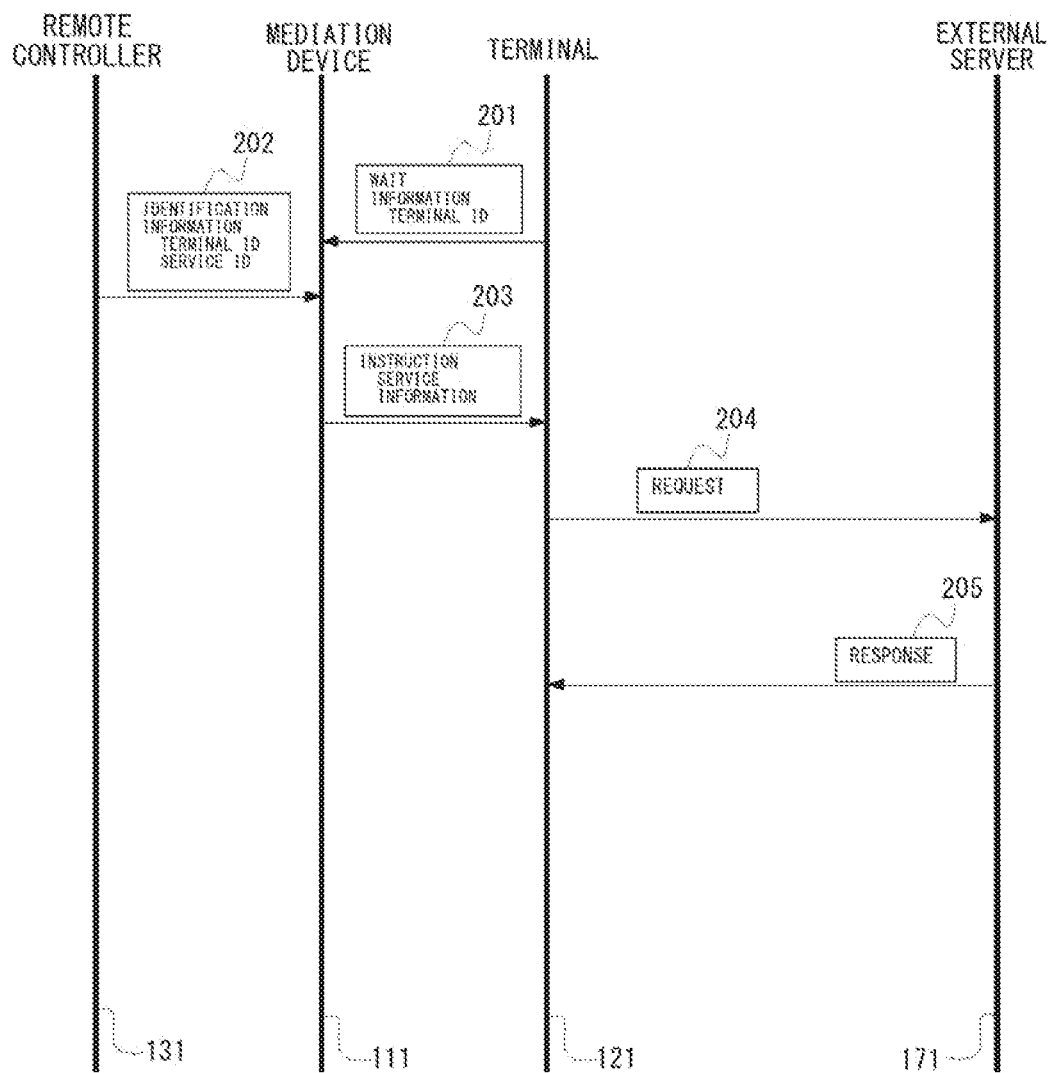
FIG. 2 is an explanatory drawing illustrating the exchange of various types of information in an embodiment of the present disclosure.
Figure 3:
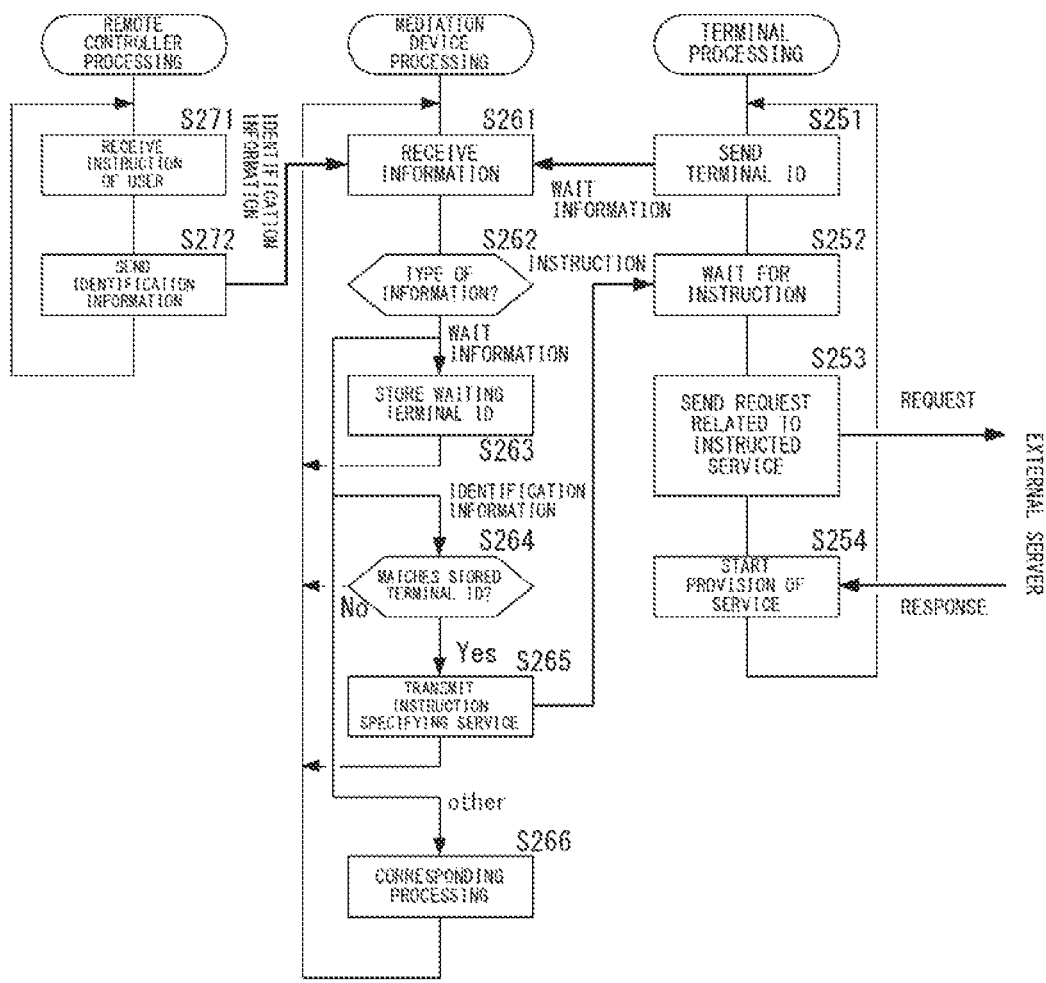
FIG. 3 is an explanatory drawing illustrating processing executed at each component, and the relationships therebetween, in an embodiment of the present disclosure.

Next, in the remote control system 101 having the basic configuration of the present embodiment, an overview of a case is described in which the remote controller 131 controls the terminal 121 using the mediation device 111, and issues a request to the external server 171 for the provision of a service. FIG. 2 is an explanatory drawing illustrating the exchange of various types of information in an embodiment of the present disclosure. FIG. 3 is an explanatory drawing illustrating processing executed at each component, and the relationships therebetween, in an embodiment of the present disclosure.

Firstly, the terminal 121 sends wait information 201 to the mediation device 111 to inform the mediation device 111 of a terminal ID that identifies the terminal 121 (step S251), and waits for an instruction to be transmitted from the mediation device 111 (step S252).

If there is information sent from another device (step S261), the mediation device 111 investigates the type of that information (step S262). If that information is the wait information 201 from the terminal 121 (step S262; WAIT INFORMATION), the terminal ID of the terminal 121 that sends the wait information 201 is stored for a predetermined validity period as a device waiting for an instruction from the mediation device 111 (step S263). Then, the mediation device 111 executes step S261.

Here, in a case in which the user desires to receive a service via the browser of the terminal 121, the terminal 121 waits at the browser of the terminal 121 for an instruction to be transmitted. In this case, typically, a wait page published by the mediation device 111 serving as the web server is loaded in the browser, and the browser executes a browser script that is a terminal program specified by the wait page to inform the mediation device 111 that the terminal 121 is waiting.

In a case in which the user desires to receive the service via a virtual desktop client or a terminal client of the terminal 121, the terminal 121 waits at these clients for an instruction to be transmitted. In this case, the program of the client communicates with the mediation device 111 to inform the mediation device 111 that the terminal 121 is waiting.

A terminal ID for identifying the terminal 121 to be controlled by the remote controller 131 is also set in the remote controller 131. One or a plurality of terminal IDs may be set in one remote controller 131. When a plurality of terminal IDs is set, the user of the remote controller 131 selects the terminal ID of the terminal 121 to be operated. Various aspects of the terminal ID are described later.

A service ID is also set in the remote controller 131. The service ID is for identifying the service to be provided at the terminal 121 to be controlled. One or a plurality of service IDs may be set in one remote controller 131. When a plurality of service IDs is set, the user of the remote controller 131 selects the service ID of the service for which provision is to be received. Any identification information for identifying a service can be used as the service ID.

Then, the remote controller 131 receives an instruction of the user (step S271) and, in accordance with that instruction, sends, to the mediation device 111, the identification information 202 that identifies the terminal 121 to be controlled and the service to be received at that terminal 121 (step S272). In the present embodiment, the terminal ID of the terminal 121 and the service ID of the service are specified in the identification information.

After the sending, the remote controller 131 executes step S271.

If the information from the other device is the identification information 202 from the remote controller 131 (step S262; IDENTIFICATION INFORMATION), the mediation device 111 investigates if the terminal ID specified in the identification information 202 sent from the remote controller 131 matches any of the terminal IDs in which an indication of currently waiting for transmission of an instruction is stored (step S264).

If there is a matching terminal ID (step S264; Yes), an instruction 203 specifying the service associated with the service ID specified in the sent identification information 202 is transmitted to the terminal 121 having the matching terminal ID (S265), and step S261 is executed. If there is no matching terminal ID (step S264; No), step S261 is executed.

Here, a universal resource locator (URL), a domain name, a server name, a host name, a port number, and the like of the external server 171 that provides the service are specified in the instruction 203. The external server 171 that provides the service is identified by these pieces of service information. In addition, as described later, the service information can further include various types of privilege information or the like for receiving the service.

When the instruction 203 is transmitted from the mediation device 111 (step S252), the terminal 121 sends, to the external server 171 that provides the service, a request 204 related to the service information specified in the transmitted instruction 203 (step S253). As a result, the provision of the service from the external server 171 is started via the terminal 121 (step S254). Due to the sending of the request 204, the external server 171 obtains the terminal ID of the terminal 121. In response to the request 204, the external server 171 sends a response 205 related to the service to the terminal 121.

The terminal 121 may execute step S251 immediately after the provision of the service is started (step S254). In this case, the provision of the service and waiting for a new instruction 203 are carried out in parallel, which is preferable in a case of zapping in the browser (described later) or a case in which multiple sign-ins or log-ins are allowed to a virtual desktop client or a terminal client.

The terminal 121 may execute step S251 after the provision of the service is complete. This is preferable in a case in which multiple sign-ins or log-ins to the virtual desktop client or the terminal client are forbidden.

If the information from outside is of another type (step S262; OTHER), the mediation device 111 executes corresponding processing (step S266), and then executes step S261.

Next, various technologies that can be added to the basic configuration described above are described. Note that in the description above, an explanatory diagram obtained by combining a flowchart and a session diagram is used. However, in the following, to facilitate comprehension, description is carried out using session diagrams that illustrate communication schemes. In these diagrams, illustration of the processing at each constituent is omitted.

Privilege Information

In response to the request sent from the terminal 121, the external server 171 may send a provision response for actually providing the service or may send a deny response for denying the provision of the service.

For example, in a case in which control is performed from the remote controller 131 to cause the browser of the terminal 121 to transition to the top page of a web service, the user of the terminal 121 may be any of a number of people. In this case, the external server 171 returns a provision response in response to the request.

However, predetermined privileges may be required in order for the user of the terminal 121 to receive the service from the external server 171. That is, in one aspect, whether to provide the service is determined on the basis of privilege information of the user or, in other words, a requirement for service provision is that the privilege information satisfies a predetermined condition. In the present embodiment, it is possible to configure such that there is no need for the user to input the privilege information on the terminal 121.

Examples of the privilege information required to receive the provision of the service include a user name, a password, an access key, a use certificate, an access token, a seed for one-time password generation, and similar information determined together with the service, and personal information such as a name, an address, a telephone number, an email address, a birth date, a personal identification number, an insurance number, a passport number, and the like.

These pieces of privilege information can be recorded by being inputted into the remote controller 131 by the user. In addition, as described later, it is possible to configure such that automatic registration of an account in the external server 171 and automatic acquisition of privilege information to the remote controller 131 are carried out. The privilege information may be recorded in association with each service ID, or may be recorded as common privilege information for all of the service IDs.

The external server 171 determines whether to provide the service on the basis of the privilege information transmitted from the remote controller 131.

Figure 4:
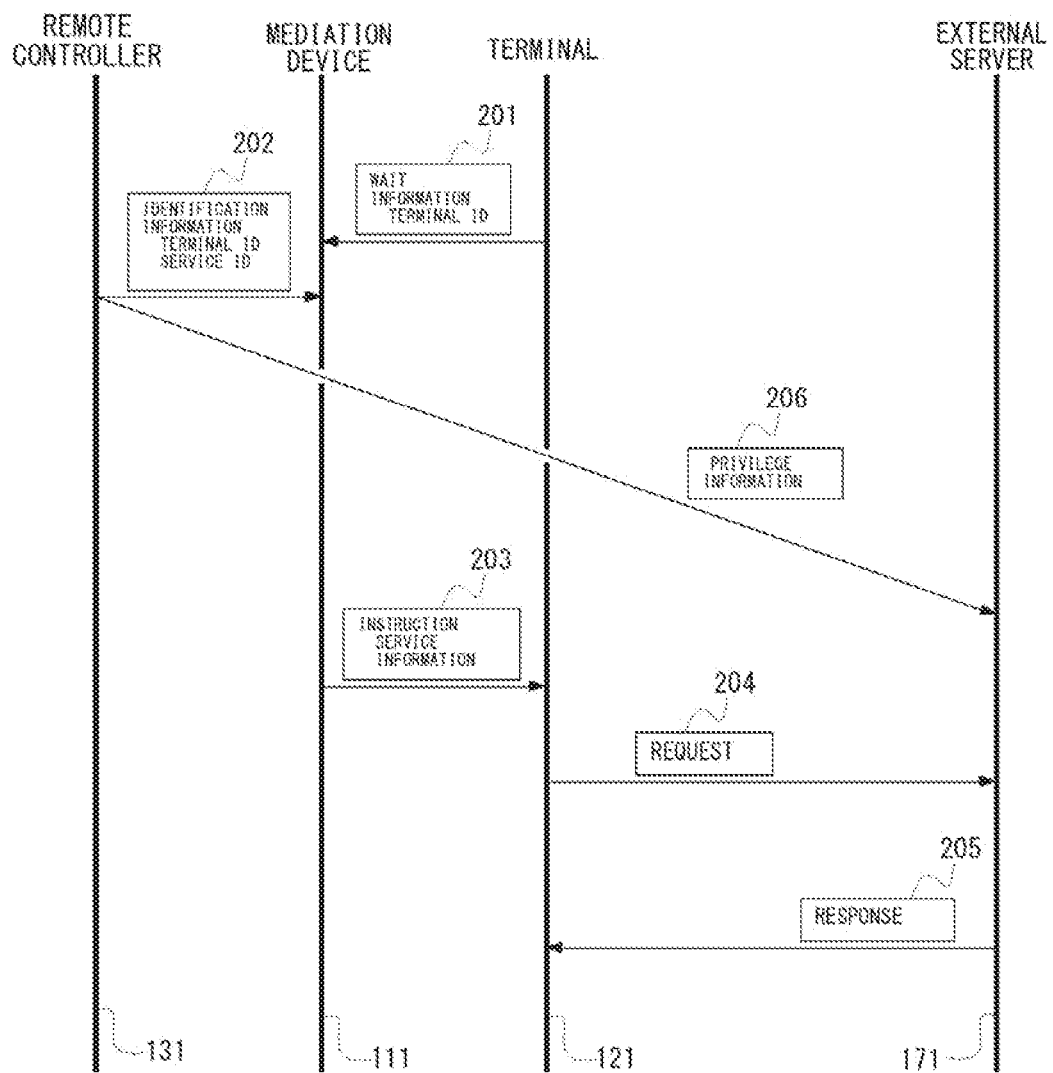
FIG. 4 is an explanatory drawing illustrating an aspect in which privilege information is directly sent from a remote controller to an external server in an embodiment of the present disclosure.

FIG. 4 is an explanatory drawing illustrating an aspect in which the privilege information is directly transmitted from the remote controller to the external server in an embodiment of the present disclosure. As illustrated in FIG. 4, the remote controller 131 can directly transmit privilege information 206 to the external server 171. In this case, the remote controller 131 sends the privilege information 206 to the external server 171 and also sends the identification information 202 to the mediation device 111.

Figure 5:
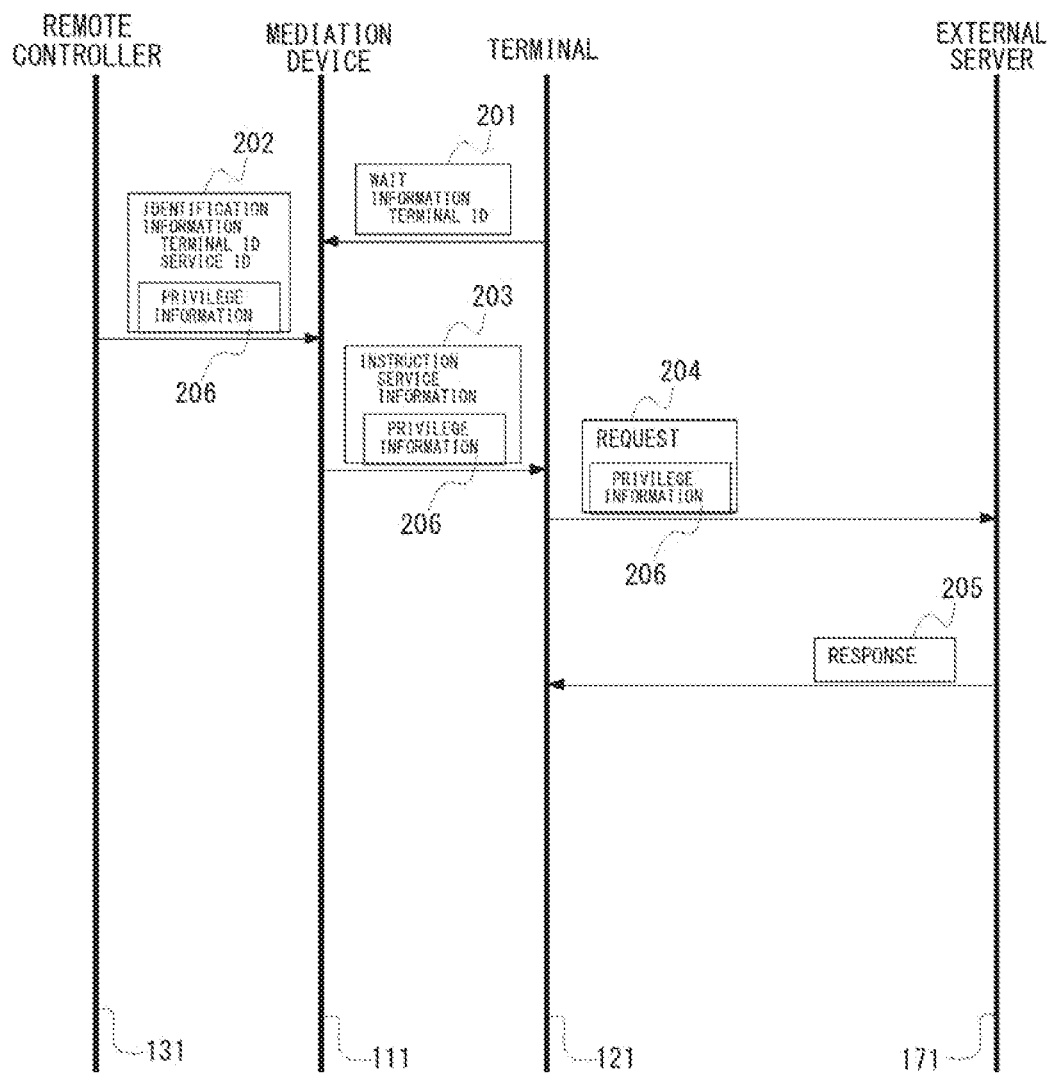
FIG. 5 is an explanatory drawing illustrating an aspect in which the privilege information is transmitted from the remote controller to the external server via a mediation device and a terminal in an embodiment of the present disclosure.

FIG. 5 is an explanatory drawing illustrating an aspect in which the privilege information is transmitted from the remote controller to the external server via the mediation device and the terminal in an embodiment of the present disclosure. As illustrated in FIG. 5, the remote controller 131 can transmit the privilege information 206 to the external server 171 via the mediation device 111 and the terminal 121. That is, the remote controller 131 includes the privilege information 206 in the identification information 202 and sends the identification information 202 to the mediation device 111. The mediation device 111 includes the privilege information 206 in the instruction 203 and transmits the instruction 203 to the terminal 121. The terminal 121 sends, to the external server 171, the request 204 specifying the privilege information 206 specified in the instruction transmitted from the mediation device 111. Thus, the privilege information 206 is transmitted from the remote controller 131 to the external server 171.

Note that, in an aspect in which the privilege information 206 is transmitted from the remote controller 131 to the external server 171, in order to prevent leaks during transmission, it is preferable that the privilege information 206 is encrypted with a public key of the external server 171 and then sent. In this aspect, the external server 171 decrypts the sent cryptogram of the privilege information 206 using the private key of external server 171 and, then, determines whether to provide the service.

Figure 6:
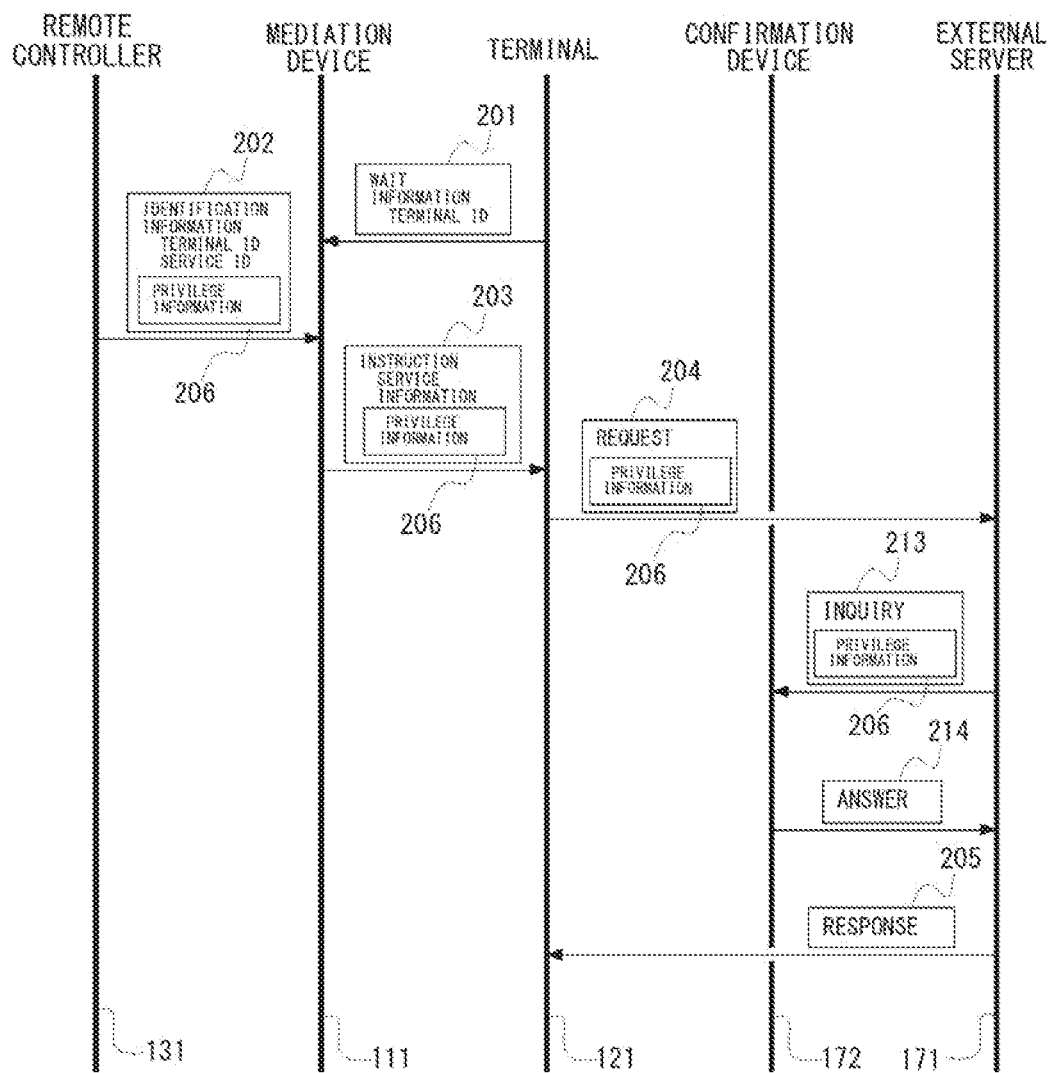
FIG. 6 is an explanatory drawing illustrating an aspect in which the privilege information transmitted from the remote controller to the external server is sent to a confirmation device in an embodiment of the present disclosure.

FIG. 6 is an explanatory drawing illustrating an aspect in which the privilege information transmitted from the remote controller to the external server is sent to a confirmation device in an embodiment of the present disclosure. In the example illustrated in FIG. 6, an assumption is made that the confirmation device 172 executes issuance and authentication of the privilege information on the basis of a request from the external server 171. As such, the external server 171 sends to the confirmation device 172 that provides a directory service or a network password service and that is linked to the external server 171, an inquiry 213 specifying the privilege information 206 transmitted to the external server 171, determines whether to allow or deny the sign-in or log-in, and obtains an answer 214 to the inquiry 213.

Additionally, in FIG. 6, an assumption is made that the privilege information 206 is transmitted from the remote controller 131 to the external server 171 on the same paths as in FIG. 5. However, a similar application is possible even if the confirmation device 172 transmits the privilege information 206 on different paths.

Additionally, it is possible to use the mediation device 111 as the confirmation device 172.

Figure 7:
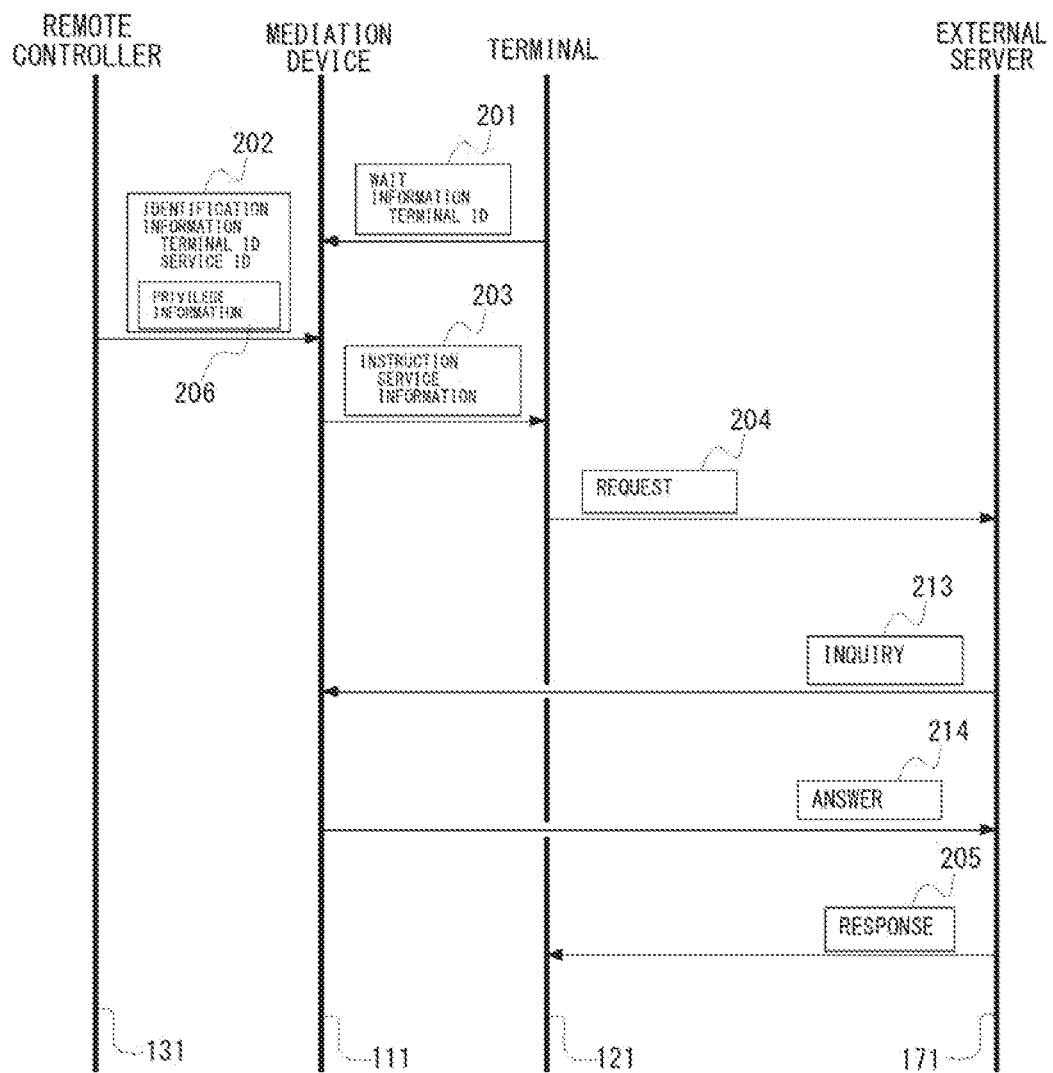
FIG. 7 is an explanatory drawing illustrating an aspect in which the privilege information is sent from the remote controller to the mediation device, and an inquiry is issued from the external server in an embodiment of the present disclosure.

FIG. 7 is an explanatory drawing illustrating an aspect in which the privilege information is sent from the remote controller to the mediation device, and an inquiry is issued from the external server in an embodiment of the present disclosure. In the example illustrated in FIG. 7, when the mediation device 111 fulfills the role of the confirmation device 172, the privilege information 206 sent from the remote controller 131 is processed at the mediation device 111 without passing through the external server 171. That is, the privilege information 206 is sent from the remote controller 131 to the mediation device 111. The mediation device 111 associates the privilege information 206 or the result of the determination of whether to allow or deny the sign-in or log-in based on the privilege information 206 with the terminal ID and the service ID, and accumulates the associated information for a certain amount of time. Then, if there is an inquiry 213 related to the terminal ID and the service ID from the external server 171, the mediation device 111 determines whether to allow or deny the sign-in or log-in, and sends the answer 214.

In this aspect, in a case in which a service X is linked to a service Y, the privilege information of the service Y can be used for the service X.

That is, it is possible to use the privilege information of the service Y for the service X by performing processing such as described below, even if the determination of whether to allow or deny the sign-in or log-in is not made at the mediation device 111.

Specifically, when the service ID related to the service X is selected by the remote controller 131, the privilege information related to the service Y is transmitted to the external server 171 or the confirmation device 172 related to the service X. The external server 171 or the confirmation device 172 to which the privilege information related to the service Y is transmitted issues, to the external server related to the service Y, an inquiry about whether the privilege information is valid. Then, a determination can be made on the basis of that result about whether to provide the service X.

Figure 8:
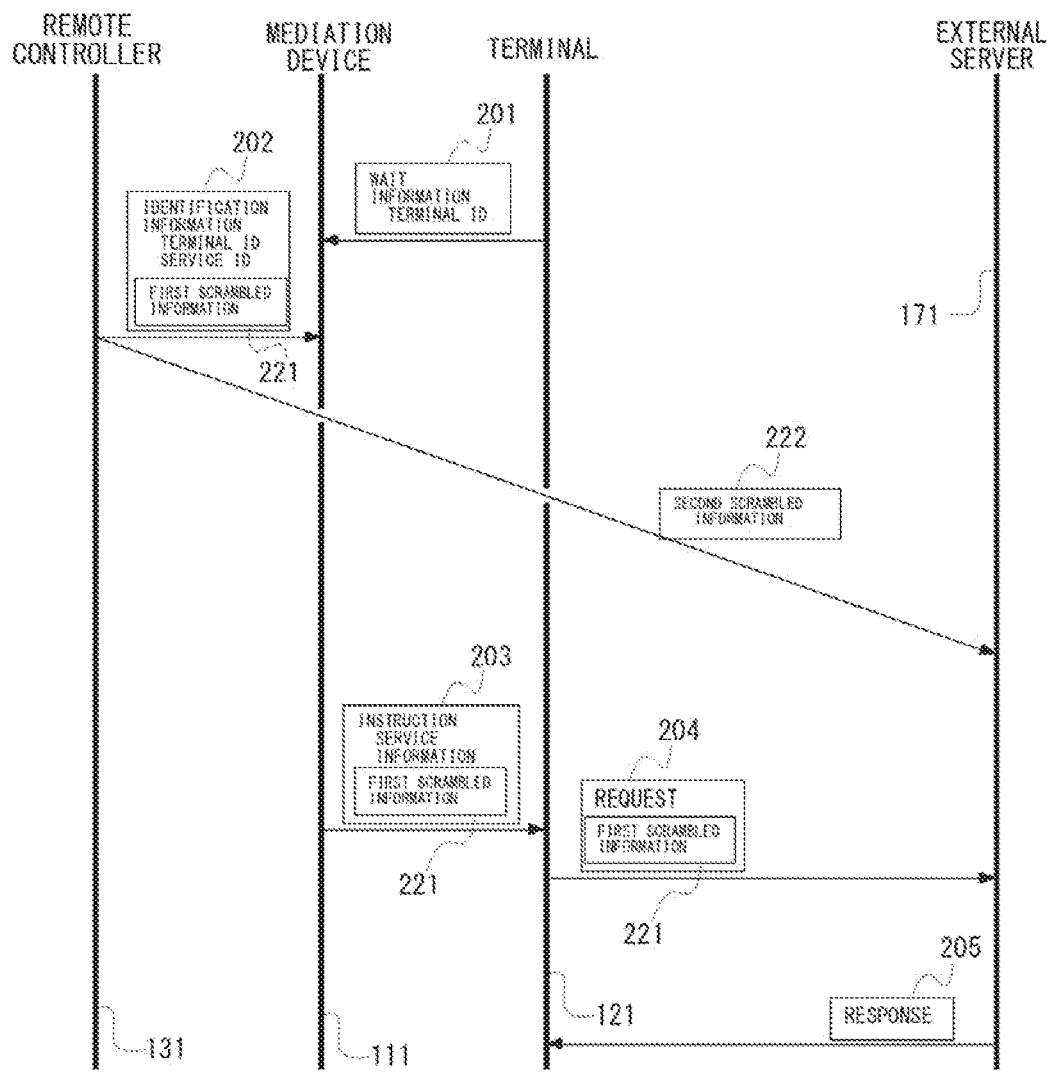
FIG. 8 is an explanatory drawing illustrating an aspect in which the privilege information is scrambled at the remote controller and is transmitted to the external server via two paths in an embodiment of the present disclosure.

FIG. 8 is an explanatory drawing illustrating an aspect in which the privilege information is scrambled at the remote controller, and the scrambled privilege information is transmitted to the external server via two paths in an embodiment of the present disclosure. In the example illustrated in FIG. 8, first scrambled information 221 and second scrambled information 222 are generated by scrambling the privilege information 206. The scrambling that is executed here means that the privilege information 206 can be recovered if both the first scrambled information 221 and the second scrambled information 222 are provided, and that recovery of the privilege information 206 is difficult if only one of the first scrambled information 221 and the second scrambled information 222 is provided.

For example, it is possible to set one of the first scrambled information 221 and the second scrambled information 222 as a cryptogram of the privilege information 206, and the other as a decryption key for decrypting the cryptogram.

In addition, it is possible to divide an information string of the privilege information 206 (for example, a bit string or a byte string) into a string consisting of even numbered elements and a string consisting of odd numbered elements, and set one of these strings as the first scrambled information 221 and the other as the second scrambled information 222.

The remote controller 131 includes the first scrambled information 221 in the identification information 202 and sends the identification information 202 to the mediation device 111, and transmits the second scrambled information 222 directly to the external server 171, thereby transmitting the second scrambled information from the mediation device 111 to the external server 171.

The external server 171 restores the privilege information 206 from the first scrambled information 221 and the second scrambled information 222. Then, the external server 171 itself determines, or requests the confirmation device 172 or the like to determine, on the basis of the restored privilege information 206, whether to provide the service in response to the request 204 sent from the terminal 121.

Confirmation by Terminal ID

The external server 171 can also provide the service after performing a confirmation that the terminal 121 that sends the request 204 is the terminal 121 to be controlled by the remote controller 131. That is, the confirmation can be set as the requirement for the service provision.

Figure 9:
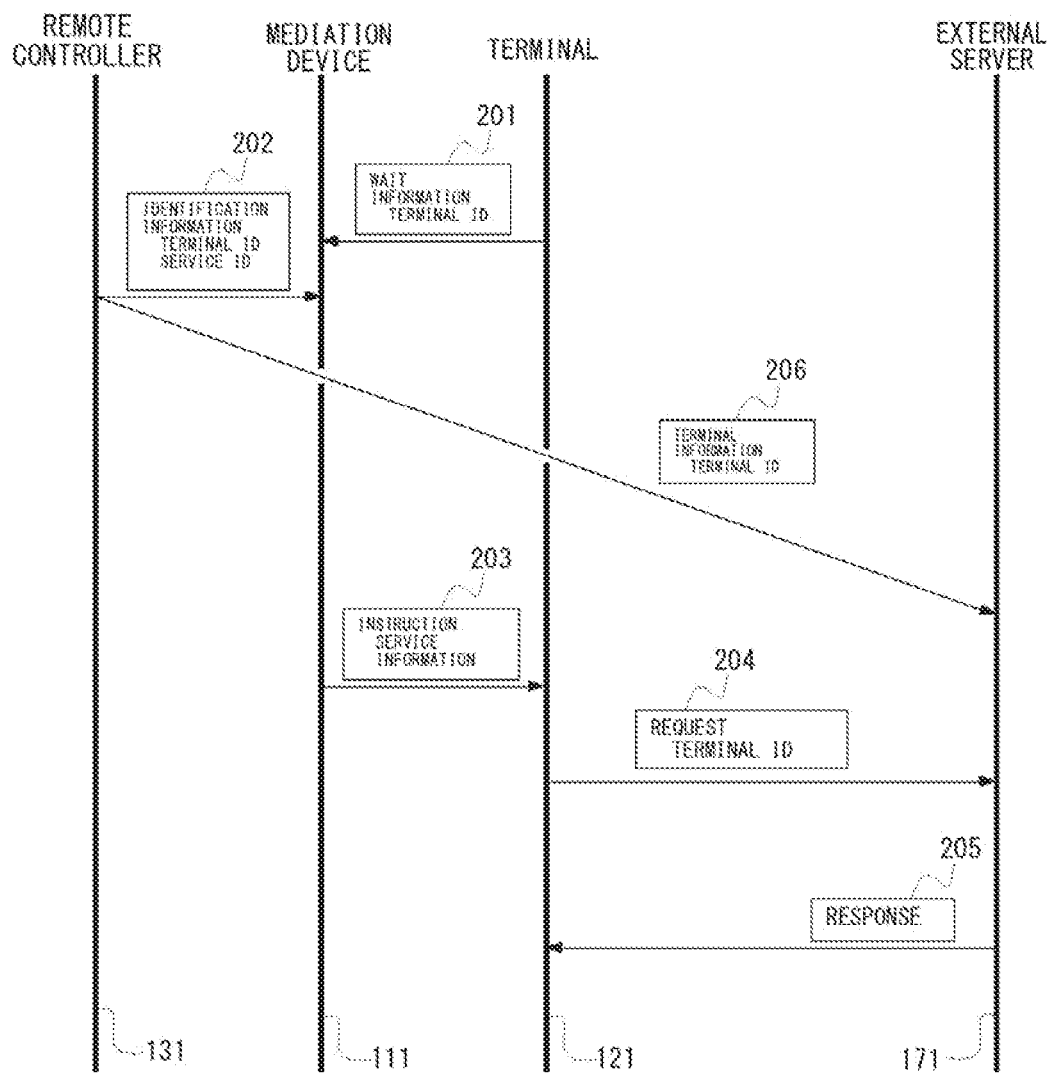
FIG. 9 is an explanatory drawing illustrating an aspect in which the external server confirms that the terminal that sends the request is the terminal to be controlled by the remote controller in an embodiment of the present disclosure.

FIG. 9 is an explanatory drawing illustrating an aspect in which the external server performs a confirmation that the terminal that sends the request is the terminal to be controlled by the remote controller. In the example illustrated in FIG. 9, the identification information 202 is sent from the remote controller 131 to the mediation device 111 and, also, terminal information 209 in which the terminal ID is specified is output from the remote controller 131 to the external server 171. In this case, the external server 171 determines, on the basis of the result of confirming whether the terminal ID of the terminal 121 that sends the request 204 matches the terminal ID specified in the terminal information 209 output from the remote controller 131, whether to provide the service.

Figure 10:
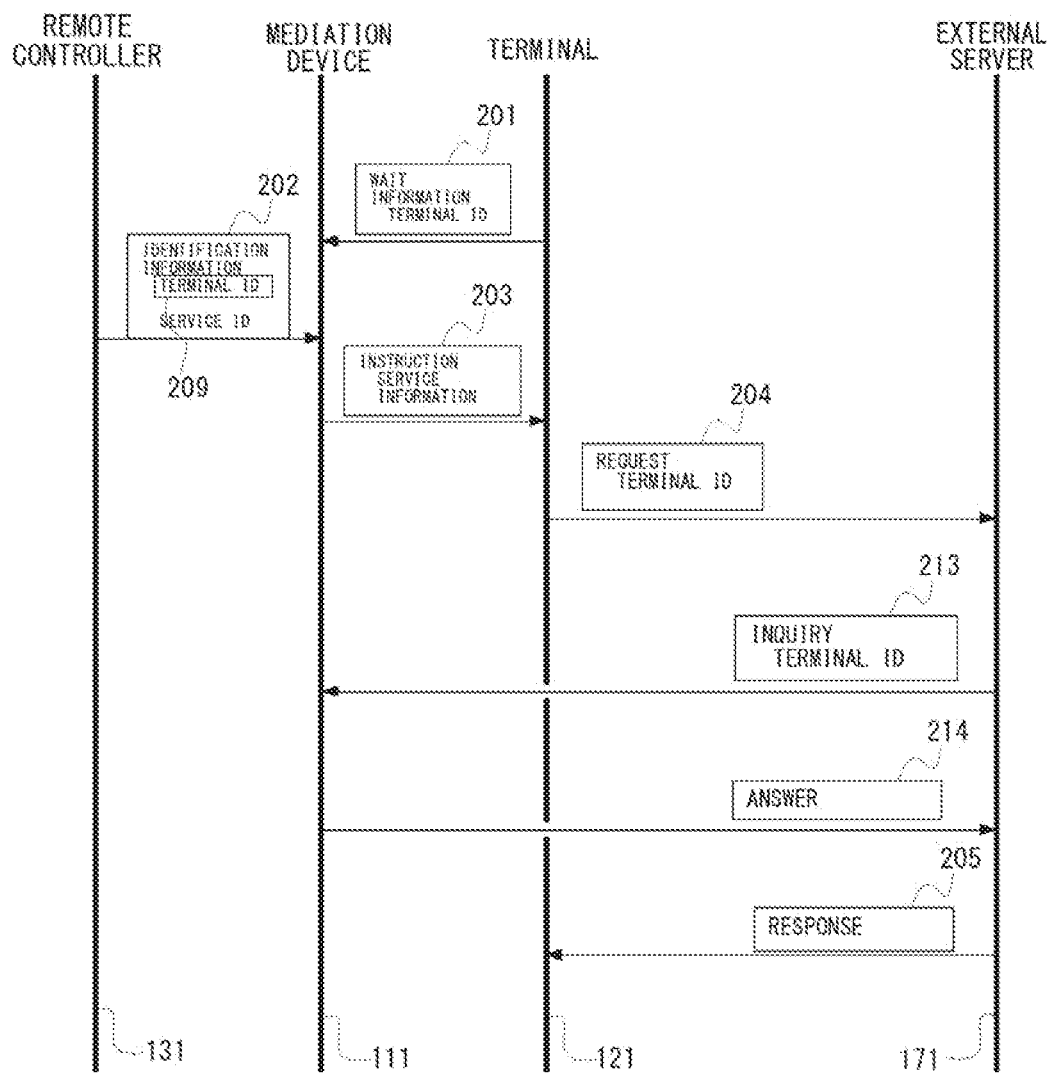
FIG. 10 is an explanatory drawing illustrating an aspect in which the mediation device confirms that the terminal that sends the request is the terminal to be controlled by the remote controller in an embodiment of the present disclosure.

FIG. 10 is an explanatory drawing illustrating an aspect in which the mediation device performs a confirmation that the terminal that sends the request is the terminal to be controlled by the remote controller. In the example illustrated in FIG. 10, the terminal ID specified in the identification information 202 is handled as the terminal information 209 output from the remote controller 131. That is, when the identification information 202 is sent from the remote controller 131 to the mediation device 111, the mediation device 111 handles the terminal ID specified in the identification information 202 as the terminal information 209, and stores the terminal ID in for a certain period (for example, a few seconds to a few minutes).

Meanwhile, when the request 204 is sent from the terminal 121 to the external server 171, the external server 171 acquires the terminal ID of the terminal 121 that is the originator of the request, and sends an inquiry 213 related to that terminal ID to the mediation device 111.

The mediation device 111 returns an answer 214 expressing whether the terminal ID related to the inquiry 213 from the external server 171 is stored.

The external server 171 sends a response 205 to the terminal 121 on the basis of the answer 214.

When an answer 214 indicating that the terminal ID is stored is returned, it is considered that the external server 171 has confirmed that the terminal 121 that sends the request is the terminal 121 to be controlled by the remote controller 131. Accordingly, in a case in which other provision conditions are satisfied such as, for example, when the sign-in or log-in for receiving the server is successful on the basis of the privilege information, the response 205 that the external server 171 sends to the terminal 121 is a provision response for providing the service and, in a case in which any of the provision conditions are not satisfied, the response 205 that the external server 171 sends to the terminal 121 is a deny response for denying the provision of the service.

When an answer indicating that the terminal ID is not stored is returned, the confirmation described above is not obtained, and the response 205 that the external server 171 sends to the terminal 121 is a deny response for denying the provision of the service.

Figure 11:
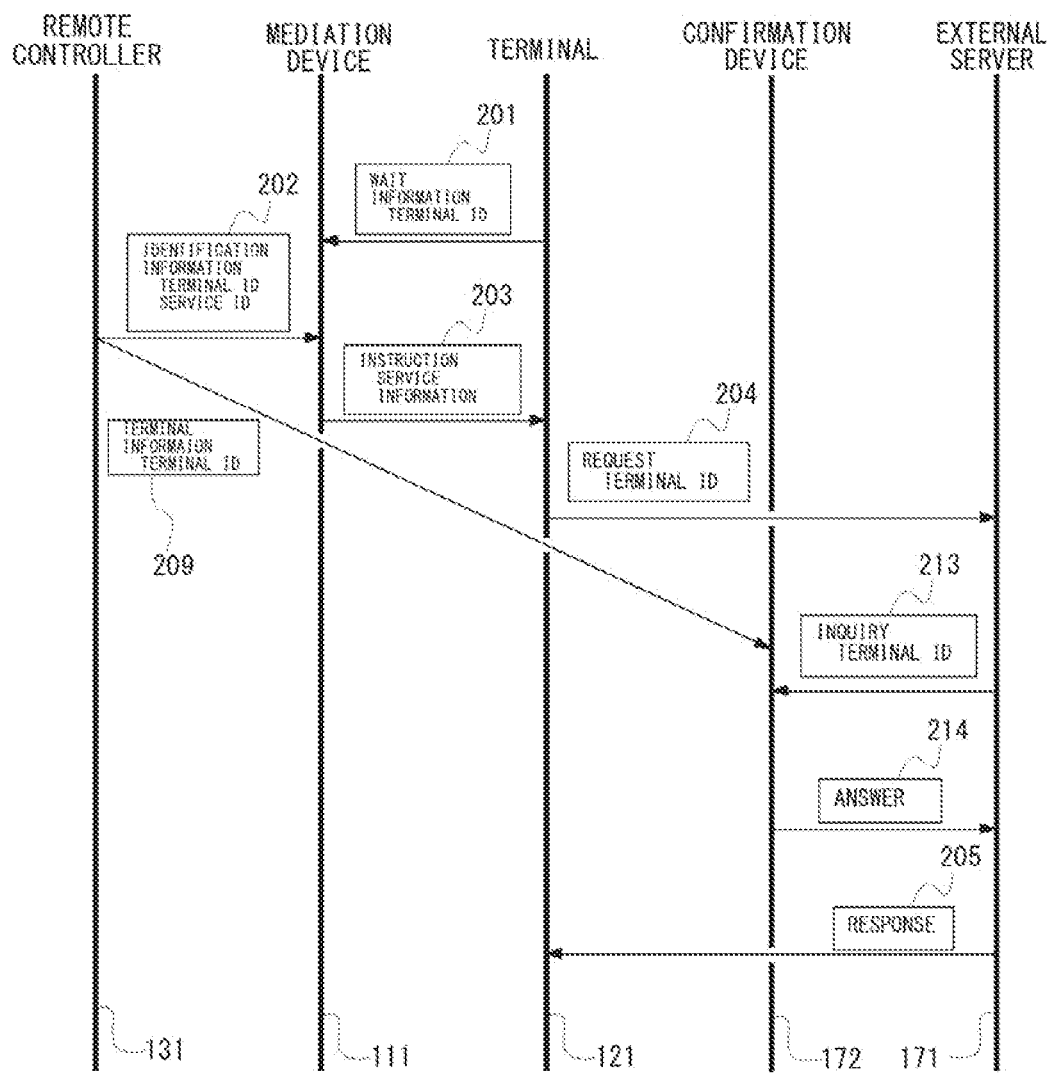
FIG. 11 is an explanatory drawing illustrating an aspect in which the confirmation device confirms that the terminal that sends the request is the terminal to be controlled by the remote controller in an embodiment of the present disclosure.

FIG. 11 is an explanatory drawing illustrating an aspect in which the confirmation device performs a confirmation that the terminal that sends the request is the terminal to be controlled by the remote controller. In the example illustrated in FIG. 11, the terminal information 209 that specifies the terminal ID is output from the remote controller 131 to the confirmation device 172.

When the inquiry 213 that specifies the terminal ID is sent from the external server 171, the confirmation device 172 determines, on the basis of whether the terminal ID related to that inquiry 213 is output from the remote controller 131, whether to allow or deny the sign-in or log-in, and sends the answer 214 to the external server 171.

Descriptions are given above of various aspects of whether to reference the privilege information 206 and whether to confirm the terminal 121 in order to determine whether to allow or deny the service provision. However, these aspects can be combined as desired and all of these aspects are included in the scope of the present disclosure.

In the various embodiments and combinations thereof, it is preferable that the sign-in or log-in be allowed only when, as in the example of the mediation device 111 described above, the difference between a date and time at which the request arrives at the external server 171 related to a certain terminal ID and a date and time at which the privilege information or the terminal information related to the same terminal ID arrives at the external server 171 or the like is within a predetermined threshold period (for example, from a few seconds to tens of minutes).

Provision of Terminal ID

As described above, in the present embodiment, the terminal ID is referenced in order to identify, using the remote controller 131, the terminal 121 to be operated by the remote controller 131. A user name assigned to the user, a host name, an IP address, a full qualified domain name (FQDN), or the like assigned to the terminal 121, or a combination thereof such as a set of information required when logging in with secure shell (ssh), for example, or the like can be used as this terminal ID.

In addition, a terminal ID that is uniquely assigned to each browser or client of the terminal 121 can be used as the terminal ID. In this aspect, when a plurality of browsers or clients operates on one terminal 121, different terminal IDs are assigned to each browser or each client in order to distinguish and identify each browser or client. Hereinafter, this aspect is described.

The terminal ID may be acquired by the terminal 121 on which the browser or client operates generating the terminal ID, or the mediation device 111 may be caused to generate the terminal ID and the terminal ID may be acquired from the mediation device 111. The terminal 121 must acquire the generated terminal ID and, also, provide the terminal ID to the remote controller 131 and cause the remote controller 131 to store the terminal ID.

The simplest method of providing the terminal ID includes displaying the acquired terminal ID on a screen of the browser or client operating on the terminal 121, and causing the user to manually input the terminal ID on the remote controller 131.

To avoid the complexity of manual input, the terminal ID may be converted to a code using a barcode or a two-dimensional code such as a QR code (registered trademark), and displayed on the screen. In this aspect, when the user images the code displayed on the screen by a camera of the remote controller 131, the remote controller 131 performs code recognition on the code to acquire the terminal ID, and registers the terminal ID in the remote controller 131.

In cases in which an extremely long character string is used as the terminal ID, manual input and code conversion may be difficult. In such a case, a method is possible in which a temporary code having a small number of characters (for example, a number having from about four to eight digits) is temporarily linked to the terminal ID, and the linked temporary code is displayed on the screen of the terminal 121.

The relationship between the terminal ID and the temporary code is similar to the relationship between a URL and a short URL. Typically, the terminal 121 informs the mediation device 111 and the like of the terminal ID to be provided to the remote controller 131. Upon such informing, the mediation device 111 temporarily generates a unique temporary code, associates that temporary code with the terminal ID, and stores the associated information.

Alternatively, a configuration is possible in which the mediation device 111 generates the terminal ID and the temporary code to be associated with the terminal ID, and informs the terminal 121 of terminal ID and the temporary code. The terminal 121 stores the terminal ID handed off from the mediation device 111 and uses the terminal ID in the following processing.

When, in response to the temporary code being displayed on the screen of the terminal 121, the user inputs the linked code on the remote controller 131, the remote controller 131 communicates the inputted linked code to the mediation device 111. Provided that there are no input mistakes by the user or image recognition mistakes, the linked code inputted by the user should match the temporary code displayed on the screen.

If there is a terminal ID that is stored in association with the communicated linked code, the mediation device 111 provides that terminal ID to the remote controller 131. If not, the absence of a terminal ID is communicated to the remote controller 131, and a message prompting re-input or the like is displayed on the remote controller 131.

Similar to a conventionally used session ID in browser communication, the terminal ID can be generated at the mediation device 111 and acquired by the terminal 121.

In addition, in an aspect in which, in order for the terminal 121 to prove the identity of the terminal 121 itself, a public key and a private key are generated at the terminal 121 and the keys are recorded in the terminal 121, the terminal 121 can be identified by the public key. Here, key information for identifying the public key is used as the terminal ID.

The generated public key can be used without modification as the key information. Additionally, the public key generated by the terminal 121 may be registered with a public key server, and an identification name registered in association with that public key may be used as the key information.

In a case in which the browser operating on the terminal 121 is to be controlled by the remote controller 131, that browser loads a wait page that is published by the mediation device 111. When the wait page is loaded in the browser, the browser executes a script program (terminal program) specified on the wait page. As a result of this execution, the terminal ID can be stored in a storage area of the terminal 121 such as the browser cookies or the browser local storage linked to the wait page.

Additionally, in a case in which a client operating on the terminal 121 is to be controlled by the remote controller 131, the terminal ID is stored in a storage area of the terminal 121 such as the client setting files, or the like.

Figure 12:
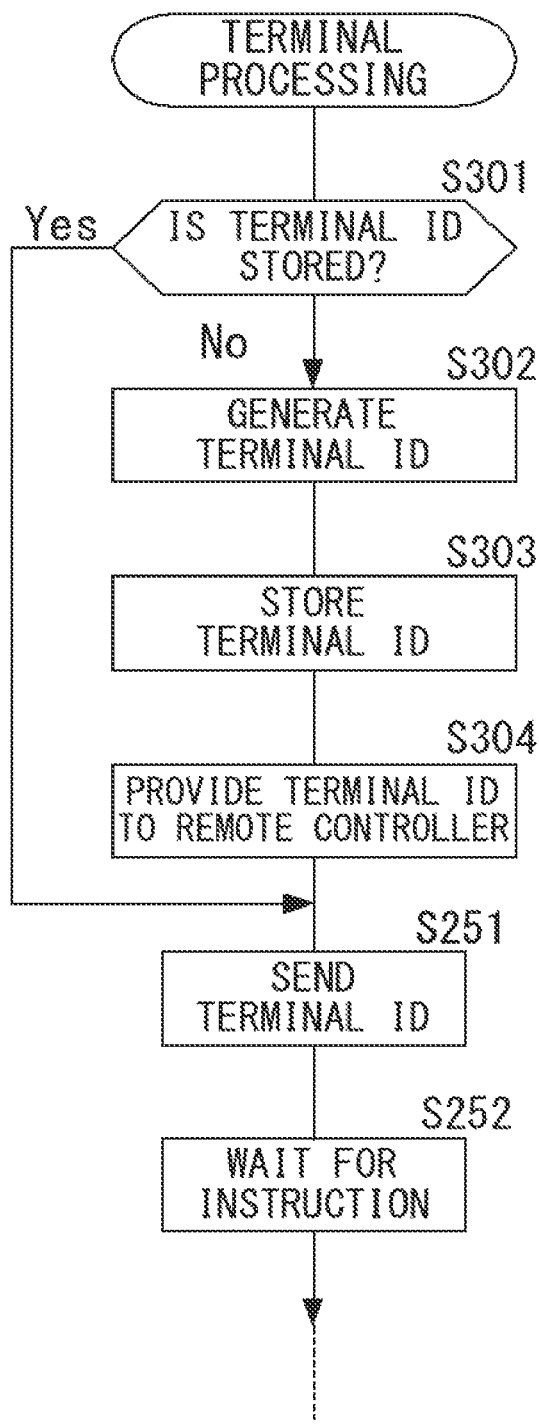
FIG. 12 is a flowchart illustrating an example of the control flow of processing at the terminal.

When the browser of the terminal 121 loads the wait page from the mediation device 111 or, when the client of the terminal 121 is started, the following processing is executed. In the following, to facilitate comprehension, a procedure is described in which the terminal ID is generated at the terminal 121. However, as described above, the terminal ID may be generated by the mediation device 111, and such aspects are also included in the present embodiment. FIG. 12 is a flowchart illustrating an example of the control flow of processing at the terminal.

Specifically, the terminal 121 investigates whether the terminal ID is stored in the storage area (step S301).

If the terminal ID is not stored (step S301; No), the terminal 121 itself generates the terminal ID or causes the mediation device 111 to generate the terminal ID (step S302), and stores the generated terminal ID in the storage area (step S303).

Then, the terminal 121 displays the terminal ID stored in the storage area or the temporary code linked to the terminal ID on the screen, thereby providing the terminal ID to the remote controller 131 (step S304). When the user inputs the temporary code displayed on the screen of the terminal 121 on the remote controller 131, or scans the temporary code using a code reader of the remote controller 131, the remote controller 131 deciphers the obtained temporary code, or queries another device for the terminal ID associated with the temporary code to obtain the terminal ID. Note that a configuration is possible in which the temporary code displayed on the screen is directly provided from the terminal 121 to the remote controller 131 via Bluetooth (registered trademark), wireless LAN, or the like instead of being inputted or the like by the user.

Thereafter, the terminal 121 executes step S251 illustrated in FIG. 3 to specify, in the wait information 201, the terminal ID stored in the storage area and inform the mediation device 111 of that terminal ID and, as a result waits for an instruction from the mediation device 111.

Meanwhile, if the terminal ID is stored (step S301; Yes), step S251 is executed.

WebSocket or polling can be used to wait for the instruction from the mediation device 111.

In WebSocket, a communication path with the mediation device 111 is established, and the instruction is transmitted via that communication path. Accordingly, the terminal 121 will wait for the instruction from the mediation device 111 as long as WebSocket is maintained.

In polling, a request in which the terminal ID is specified is intermittently sent from the terminal 121 to the mediation device 111, and the instruction from the mediation device 111 is transmitted depending on the response to that request. Accordingly, the terminal 121 will wait for the instruction from the mediation device 111 while the request is being intermittently sent from the terminal 121 to the mediation device 111.

Note that, in IPv6 and the like, unique IP addresses are assigned to all of the communication devices used on the internet. Accordingly, if a specific port at the terminal 121 is opened in advance to the mediation device 111, the instruction can be transmitted from the mediation device 111 to the terminal 121 by carrying out communication from the mediation device 111 to the port of that IP address, after the information indicating that the terminal 121 is waiting has been sent from the terminal 121 to the mediation device 111. In this case, connection by WebSocket or polling is unnecessary.

In addition, in an aspect in which the terminal ID is temporarily recorded in the mediation device 111 and the terminal ID is provided via the temporary code, the provision of the terminal ID from the mediation device 111 to the remote controller 131 may be communicated from the terminal 121 to the mediation device 111, and this communication may trigger an advancement from step S304 to step S251.

In a case in which the terminal ID is already stored in the storage area (step S301; Yes), the terminal 121 executes step S251. In this flow, the provision of the terminal ID is carried out only when the wait page is accessed or the client is started up for the first time, or when the storage area of the terminal 121 is cleared.

In addition, in a case in which the key information used as the terminal ID is stored in the storage area of the terminal 121 (step S301; Yes), step S304 may be executed instead of step S251 (not illustrated in the drawings). In this aspect, the terminal ID or the temporary code related to the terminal ID to be provided to the remote controller 131 is constantly displayed on the wait page of the terminal 121 and, as such, linking with the remote controller 131 can be performed at any time. However, the aspect in which step S251 is executed after step S301 is preferable in cases in which the terminal ID is temporarily recorded in the mediation device 111 and the terminal ID is provided via a temporary code.

In the description given above, the terminal ID stored in the storage area is informed to the mediation device 111 in step S251. However, in a case in which the terminal ID is already stored in the browser cookies, the terminal ID is also specified in the request for loading the wait page from the mediation device 111. Accordingly, in a case in which the terminal ID is stored in the storage area, when using WebSocket to establish the communication path for waiting for the instruction from the mediation device 111, the processing for informing the terminal ID in step S251 can be omitted, and step S252 can be executed.

Registration with external service and acquisition of privilege information In an aspect in which the privilege information is transmitted from the remote controller 131 to the external server 171 to enable logging in or signing in from the terminal 121, the privilege information for various services are accumulated in the remote controller 131. Therefore, it is possible to perform automatic registration with a new service by using the privilege information accumulated in the remote controller 131.

In this aspect, a list of service IDs of multiple services is stored in the remote controller 131. In one example, this list is acquired from the mediation device 111. The service IDs included in the list are, for example, for highly reliable services authorized by an administrator of the mediation device 111, that is, are for services for which risk is low when automatically registering an account.

Figure 13:
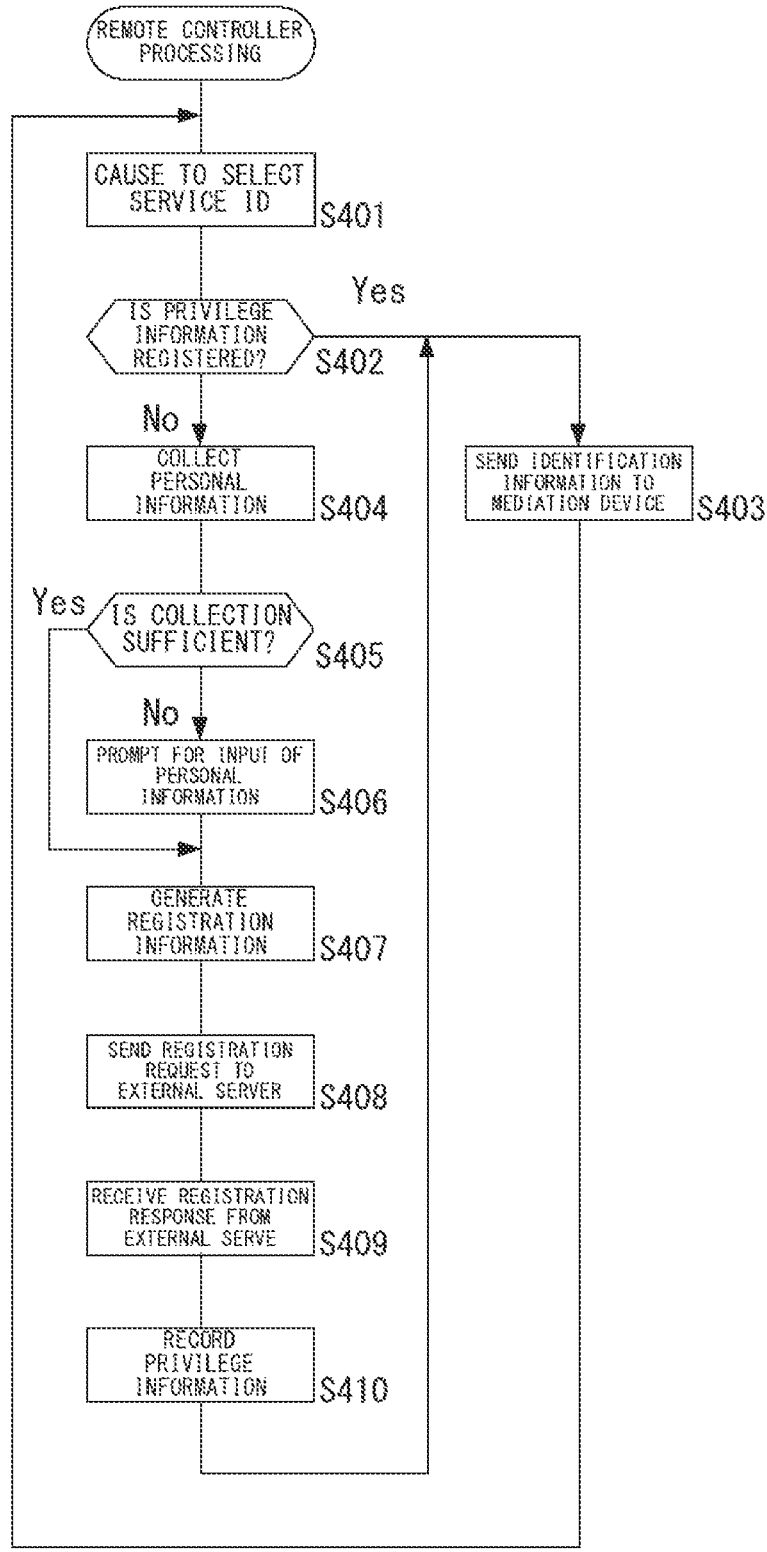
FIG. 13 is a flowchart illustrating an example of the control flow of processing at the remote controller.

FIG. 13 is a flowchart illustrating an example of the control flow of processing at the remote controller. Hereinafter, a description is given while referencing FIG. 13.

In this aspect, firstly, the remote controller 131 causes the user to select the service ID of the service to be used (step S401).

If the privilege information for the selected service ID is already registered in the remote controller 131 (S402; Yes), that privilege information is transmitted to the external server 171 related to that service ID, the identification information related to the selected service ID is sent to the mediation device 111 (step S403), and step S401 is executed.

Meanwhile, if the privilege information for the selected service ID is not yet registered in the remote controller 131 (step S402; No), the remote controller 131 collects personal information from the privilege information that is already registered in the remote controller 131 (step S404).

As described above, the services having the service IDs included in the list stored in the remote controller 131 are authorized services, and, regardless of the type of personal information required for account registration, as long as that personal information is prepared in the list, registration information can be generated.

In a case in which the personal information required for account registration cannot be sufficiently collected (step S405; No), that is, in, for example, a case in which not much time has passed since starting to use the remote controller 131, when registering an account with the selected service ID, the remote controller 131 prompts the user to input the personal information lacking in the collected information (step S406).

For example, when using the remote controller 131 for the first time, personal information is not registered in the remote controller 131. In this case, if the user selects a service A that requires an email address for account registration, the remote controller 131 prompts the user to input an email address.

Next, if the user selects a service B that requires an email address, a name, and a birth date for account registration, the remote controller 131 uses the email address that is already inputted, and prompts the user to input a name and a birth date.

Thus, each time it is found that personal information not registered in the remote controller 131 is required for account registration, the remote controller 131 prompts the user to input that personal information, but once personal information is registered in the remote controller 131, the user does not need to re-input that personal information.

Note that, when a fixed password is required at account registration, it is sufficient that the remote controller 131 randomly generates a password and sets the generated password as service-specific personal information.

In a case in which the personal information required for account registration is sufficiently collected (step S405; Yes), and in a case in which the lacking personal information is inputted (step S406), the registration information required for account registration for the selected service ID is generated on the basis of the collected or inputted personal information (step S407).

Then, the remote controller 131 sends a registration request specifying the registration information to the external server 171 related to the selected service ID (step S408).

Then, when a new account is registered with the external server 171, a registration response related to that service ID is sent from the external server 171 to the remote controller 131.

The simplest form of privilege information specified in the registration response is information indicating that the account registration is successful. In this case, the sent personal information or a portion thereof (for example, the user name and the password) is used without modification as the privilege information. The personal information that is used as the privilege information can be specified in advance for each service in the list stored in the remote controller 131, or the external server 171 can select the personal information that is used as the privilege information from the registration information.

Additionally, of the personal information specified in the registration request, the personal information to be used as the privilege information in future sign-ins or log-ins may specified directly or may be encrypted and specified in the registration response.

In addition, an access key, a use certificate, an access token, a one-time password generation seed, or the like that is issued by the external server 171 may by specified in the registration response. The access key, the use certificate, the access token, or the like can be used without modification as the privilege information when signing in or logging in to the service in the future.

When a one-time password generation seed is specified in the registration response, each time the privilege information is required, a one-time password is generated from the seed by the remote controller 131, and the generated one-time password is set as the privilege information. The one-time password may be a password that is used only one time and then discarded. Alternatively, a one-time password that is time synchronized with the external server 171 can be used.

When the remote controller 131 receives the registration response (step S409), the remote controller 131 records the privilege information for the service ID on the basis of the received registration response (step S410), and executes step S403. In the processing thereafter, the remote controller 131 transmits the privilege information related to the selected service ID to the external server 171 related to the selected service ID, and sends the identification information related to the selected service ID to the mediation device 111.

Note that it is possible to configure such that, in a case in which the registration of the account fails, a failure response is sent from the external server 171 to the remote controller 131. When the remote controller 131 receives the failure response, an indication of the failure is displayed on the screen of the remote controller 131, and the failure of the account registration is reported (not illustrated in the drawings).

Confirmation of Terminal ID

As illustrated in FIG. 3, when the identification information is sent from the remote controller 131 to the mediation device 111 (step S272), the mediation device 111 transmits an instruction based on that identification information to the terminal 121 (step S265). When the instruction is transmitted to the terminal 121 that is waiting (step S252) for the instruction, the request related to the service specified in the transmitted instruction is sent to the external server 171 related to that service (step S253).

When the request is received by the external server 171, as described above, the external server 171 references the information specified in the request, issues an inquiry to the mediation device 111 or the confirmation device 172 and, if there is information transmitted from the remote controller 131, references this information to determine whether to allow or deny the service provision, and sends a response corresponding to the determined result to the terminal 121.

The terminal 121 receives the response (step S254) and, if that response is a provision response, starts provision of the service via the terminal 121, and if not, issues an error report or the like.

Note that, in a case in which the key information related to the public key is being used as the terminal ID, the terminal 121 can perform an electronic signature based on the private key of the terminal 121 when sending the request to the external server 171.

In the external server 171, the confirmation device 172, or the like, in order to confirm whether the terminal 121 that sends the request is the terminal 121 to be controlled by the remote controller 131, it is sufficient that the electronic signature sent from the terminal 121 be verified by the public key identified by the key information that constitutes the terminal ID of the terminal 121 that is set as the terminal 121 to be controlled by the remote controller 131.

Selection of Personal Information Used in Account Registration

When generating the registration information, the user may be caused to select which piece of personal information to communicate from the remote controller 131 to the external server 171.

In a case in which none of the personal information required for account registration is included in the registration information, the user must input, in the external server 171, the lacking personal information.

In this case, it is sufficient that identification information including information such as that described below is sent from the remote controller 131 to the mediation device 111.

Firstly, the terminal ID of the terminal to be controlled is sent. This terminal ID is as described above.

Next, a registration service called "account registration for desired service selected by user" is set as the service to be received by the terminal.

Next, personal information selected to be communicated from the remote controller 131 to the external server 171 is set to be included in the identification information.

When such identification information is sent to the mediation device 111, the mediation device 111 transmits, to the terminal related to the terminal ID, an instruction specifying the registration service for the desired service together with the personal information included in the identification information.

In a case in which the desired service is to be provided via a browser, the URL related to an account registration form for that service, and the personal information that is to be entered in each field of that form and that is selected by the user to be communicated to the external server 171 are specified in the instruction.

In response to the instruction, the terminal 121 sends a request related to account registration to the external server 171. In a case in which the desired service is a web service, in response to the request related to account registration, the external server 171 returns, as a response, a registration form in which the personal information selected by the user is entered, but the fields for personal information not selected by the user are left empty. As such, it is sufficient that the user directly inputs the lacking personal information in the browser of the terminal 121 to advance the account registration.

When the account registration described above is complete, a registration response is sent from the external server 171 to the remote controller 131. The remote controller 131 records the privilege information specified in the registration response, thereby enabling automatic signing in or logging in when the service is selected in the future.

In the description given above, the registration request and the registration response are exchanged between the remote controller 131 and the external server 171. However, in a case in which the external server 171 delegates the various types of authentication to the confirmation device 172 or the mediation device 111, a configuration is possible in which the registration request and the registration response are exchanged between the remote controller 131, and the confirmation device 172 or the mediation device 111. Additionally, a configuration is possible in which the confirmation device 172 or the mediation device 111 relays or mediates the exchange of the registration request and the registration response between the remote controller 131 and the external server 171.

In addition, a configuration is possible in which, each time a service is used at the external server 171, the required pieces of personal information of the personal information registered in the remote controller 131 are collected and transmitted to the external server 171 as the privilege information. In this aspect, when providing the service, the personal information transmitted from the remote controller 131 can be used as condition for constantly providing the service. Accordingly, there is no need to maintain/manage, on the external server 171, personal information for account registration. Therefore, leaking and the like of personal information from the external server 171 can be prevented.

Configuration in Browser

In an aspect in which control by the remote controller 131 is performed when a web service that operates on the terminal 121 is received from the external server 171, as described above, the user operates the browser to load a wait page from the mediation device 111. A script program that operates in the browser is specified in the wait page, and that program communicates, to the mediation device 111, that an instruction is being waited for.

Generally, when a webpage is loaded in a browser, the content of that webpage is drawn in a window or a tab of that browser, and a script program specified in that webpage is executed in that window or tab. The window of tab is displayed in the screen of the terminal 121. Hereinafter, the window or tab in which the wait page is loaded is referred to as a "first window."

When the script program is executed in the first window in which the wait page is loaded and an instruction is transmitted from the mediation device 111 to the browser, the script program operating in the first window sends a request based on that instruction to the external server 171. Various aspects can be used for the sending of the request.

In the simplest aspect, the request can be sent from the first window. In this case, the first window transitions from the wait page to a response page that displays a response from the external server 171, and the service related to the external server 171 is provided via the first window. Then, since the window or tab in which the wait page is displayed disappears, the script program specified in the wait page ends, and the browser stops waiting for an instruction from the mediation device 111.

Next, a new window or tab can be generated from the first window, and a request can be sent from the generated window or tab (hereinafter referred to as a "second window").

In browsers, while it is often impossible for two independently generated windows to control each other due to security limitations, it is possible to control the second window, that is generated by executing the script program in the first window, from the first window using the script program. In this aspect, such browser functions are used.

In this aspect, the wait page is displayed in the first window, and the response from the external server 171 is displayed in the second window. Accordingly, the terminal 121 can continue to wait for an instruction from the mediation device 111 via the first window, even while the service from the external server 171 is being provided via the second window.

Here, in the viewing of television broadcasts, the act of switching channels in a short amount of time to find a preferred program is sometimes called "zapping." A situation is assumed in which the user operates the remote controller 131 and selects a different service while the wait page is displayed in the first window and the service from the external server 171 is displayed in the second window.

In a case in which a new instruction is transmitted via the wait page of the first window, and there is already a second window that is a child window of the first window, sending a request related to a new service from the second window to a new external server 171 related to that new service will cause the service provided in the second window to switch to the new service. Accordingly, a user can be provided with a browser viewing experience that is similar to zapping in the viewing of television broadcasts.

In addition, even in a case in which a new instruction is transmitted via the wait page of the first window and there is already a second window that is a child window of the first window, a new window or tab (hereinafter referred to as a "third window") can be generated and a request related to a new service can be sent from the generated third window to a new external server 171 related to that new service. In this case, the wait page is displayed in the first window of the browser, content of the previous service is displayed in the second window, and content of the new service is displayed in the third window.

A configuration is possible in which, in a case in which a new service is selected by the remote controller 131 when the first window displaying the wait page and the second window that provides the service controlled by the remote controller 131 are displayed in the browser, the user can use the remote controller 131 to appropriately select, or set in advance, whether to provide the new service in the second window (zapping) or to provide the new service in a newly generated third window (new window).

In addition, it is possible to switch between zapping and a new window depending on the state of the second window. That is, in a case in which an instruction related to the service Y is transmitted via the first window when the service X is being provided in the second window, if a zapping condition is satisfied, the request related to the service Y is sent from the second window, and the second window is transitioned from the service X to the service Y. If the zapping condition is not satisfied, a new third window is generated from the first window, and a request related to the service Y is sent from the third window. The follow aspects are conceivable for the satisfaction or non-satisfaction of the zapping condition.

For example, it is thought that, when the user is zapping, selections for switching between services in a short amount of time are being made by the remote controller 131. As such, the zapping condition is considered satisfied from the start of the provision of the service X in the second window to when a predetermined grace time (for example, about a few seconds) elapses, even if an instruction related to the service Y is transmitted. This is because, in a case in which the services are switched by the remote controller 131 in a short amount of time, it is presumed that the intention of the user for the zapping is cancel the service X and transition to the service Y.

Additionally, a configuration is possible in which the zapping condition is considered not satisfied after the user focuses on the second window of the terminal 121, moves the mouse cursor to the second window, scrolls the content of the second window, clicks on the content of the second window, or the like while the service X is being provided in the second window. In this aspect, it is thought that the user has interest in the service X and, as such, the service Y is provided in a new window by the operation of the remote controller 131, without canceling the service X.

For example, the script program of the first window can determine whether the content of the second window has been scrolled on the basis of whether a property of the second window such as pageXOffset, pageYOffset, scrollX, scrollY, or the like has changed.

In addition, a configuration is possible in which the zapping condition is not considered satisfied after a different URL is directly input in the address bar of the browser related to the second window, a link included in the content of the second window is operated to transition to another service, or the like. This is an aspect that presumes that the user directly instructs the browser that the user has interest, without using the remote controller 131.

Note that, the various aspects of the zapping condition can be appropriately combined.

In the present embodiment, it is possible to control the second window, or the like, that provides a service from the first window related to the wait page. As such, it is possible to adopt an aspect in which, when the user makes a selection with the remote controller 131 to end a service, that indication is sent to the mediation device 111 and, when the mediation device 111 transmits that indication to the browser of the terminal 121, the second window related to the service or the like is closed from the first window related to the wait page, and the provision of the service is ended.

FIG. 14 is a flowchart illustrating an example of the control flow of processing at a terminal using a zapping condition. The processing illustrated in FIG. 14 is started by the wait page being loaded in the first window, and corresponds to processing consisting of steps S251 to S254 of FIG. 3 and additional processing.

Firstly, the terminal 121 sends, to the mediation device 111, the wait information 201 that specifies the terminal ID (step S251), and waits for an instruction to be transmitted from the mediation device 111 (step S252).

When an instruction is transmitted from the mediation device 111, the terminal 121 investigates if the new window generated last from the first window has been closed (step S281). If the new window has not been closed (step S281; No), the terminal 121 investigates whether the zapping condition is satisfied for the new window (step S282).

If the zapping condition is not satisfied (step S282; No), and if the new window generated last is already closed (step S281; Yes), the terminal 121 generates a new window from the first window (step S283), sends a request from the new window generated last (step S253), and provides the service (step S254) and, in parallel with this, returns the processing of the first window to step S251.

If the zapping condition is satisfied (step S282; Yes), the processing of step S253 is executed and, as a result, the new window that is already generated is switched to the new service.

Terminal Authentication and Application Authentication

When starting the use of the remote controller 131 or when selecting a service ID using the remote controller 131, it is possible to execute, as appropriate, authentication for the remote controller 131 itself and/or authentication for a remote control program operating on the remote controller 131.

For example, among smartphones that are being sold today, there are smartphones that have a terminal locking function and there are smartphones in which a personal identification number is input, or biometric authentication such as fingerprint authentication, voice authentication, face authentication, or the like is performed in order to release the lock. The remote controller 131 of the present embodiment can be combined with such terminal authentication.

A configuration is possible in which the authentication described above is also carried out in the remote control program when the remote control program is started up or when a service ID is selected (application authentication), In the application authentication, after authentication has succeeded once, authenticating again can be omitted for a set amount of time (for example, a few minutes to tens of minutes).

A configuration is possible in which the application authentication is also omitted while the terminal 121 continues to wait for an instruction after the application authentication has succeeded once and the terminal 121 has received the provision of the service from the external server 171.

In addition to, or in place of, the authentication described above, it is possible to use the authentication based on selection order disclosed in Patent Literature 1.

Specifically, the remote controller 131 displays a table consisting of a plurality of boxes (each box may be randomly filled in or may be empty) on the screen, and the user is caused to select boxes. If the positions and order of the boxes selected by the user correspond to the selection order assigned to the user, the authentication succeeds and, if not, the authentication fails.

A configuration is possible in which the personal information and the privilege information stored in the remote controller 131 is encrypted, and the personal information and the privilege information are decrypted by the personal identification number, the biological information, the selection order, or the like to be input when executing the authentication in the remote control program. In this aspect, as long as the application authentication does not succeed, leaking of the personal information and the privilege information of the user can be prevented, even if the remote controller 131 is stolen or the like.

Conclusion

As described above, a remote control system according to the present embodiment includes a mediation device, a terminal, and a remote controller;

(a) the terminal waiting for an instruction to be transmitted from the mediation device;

(b) the remote controller sending, to the mediation device, identification information that identifies a terminal to be controlled and a service to be received by the terminal;

(c) the mediation device transmitting, to the waiting terminal, an instruction specifying the service identified by the sent identification information, if the terminal identified by the sent identification information is waiting; and (d) the waiting terminal sending, to a server related to the service specified in the transmitted instruction, a request related to the service specified in the transmitted instruction; wherein the server provides the service after performing a confirmation that the terminal that sends the request is the terminal to be controlled.

Additionally, in the remote control system according to the present embodiment, it is possible to configure such that the server performs the confirmation by querying the mediation device as to whether the terminal that sends the request is identified by the identification information sent to the mediation device.

Additionally, in the remote control system according to the present embodiment, it is possible to configure such that the remote controller outputs, to a confirmation device, terminal information identifying the terminal to be controlled, and the server performs the confirmation by querying the confirmation device as to whether the terminal that sends the request is identified by the terminal information output to the confirmation device.

Additionally, in the remote control system according to the present embodiment, it is possible to configure such that the remote controller outputs, to the server, the terminal information identifying the terminal to be controlled, and the server performs the confirmation based on whether the terminal that sends the request is identified by the outputted terminal information.

Additionally, in the remote control system according to the present embodiment, it is possible to configure such that a key pair consisting of a public key and a private key is assigned to the terminal, the terminal information identifies, based on key information identifying the public key assigned to the terminal, the terminal to be controlled, the terminal sends the request together with an electronic signature of the private key, and by verifying the electronic signature sent together with the request using the public key related to the terminal information, a determination is made as to whether the terminal that sends the request is identified by the terminal information output to the confirmation device.

Additionally, in the remote control system according to the present embodiment, it is possible to configure such that if the key pair (p) is not recorded in the terminal the terminal communicates the key information to the mediation device to wait for the instruction, and the mediation device identifies the waiting terminal by the communicated key information, (q) is recorded in the terminal, the terminal acquires and records the key pair, and provides, to the remote controller, key information identifying the public key related to the acquired key pair.

Additionally, in the remote control system according to the present embodiment, it is possible to configure such that the terminal associates the public key related to the key pair with an identification name that identifies the terminal, and publishes the public key via a public key server, and the identification name associated with the public key is set as the key information.

Additionally, in the remote control system according to the present embodiment, it is possible to configure such that the terminal displays, on a screen, a code image obtained by converting the key information to code, and the key information is provided from the terminal to the remote controller by the remote controller performing code recognition on the code image displayed on the screen.

Additionally, in the remote control system according to the present embodiment, it is possible to configure such that when the key pair is acquired by the terminal, the mediation device temporarily records the key information in association with a temporary code, the terminal displays the temporary code on a screen, when the remote controller receives an input of a linking code obtained by a user from the temporary code displayed on the screen, the remote controller communicates the linking code to the mediation device, and the mediation device provides, to the remote controller, the key information temporarily recorded in association with a temporary code that matches the communicated linking code.

Additionally, in the remote control system according to the present embodiment, it is possible to configure such that the remote controller transmits, to the server, privilege information recorded in the remote controller in association with the service, and the server provides the service to the terminal based on the transmitted privilege information.

Additionally, in the remote control system according to the present embodiment, it is possible to configure such that the remote controller includes the privilege information in the identification information, the mediation device specifies, in the instruction, the privilege information included in the identification information and, as a result, the privilege information is transmitted from the remote controller to the server via the mediation device.

Additionally, in the remote control system according to the present embodiment, it is possible to configure such that the remote controller generates first scrambled information and second scrambled information based on the privilege information, outputs the terminal information and, also transmits the first scrambled information to the server, and includes the second scrambled information in the identification information to transmit the second scrambled information to the server via the mediation device, and the server recovers the privilege information from the transmitted first scrambled information and the transmitted second scrambled information.

Additionally, in the remote control system according to the present embodiment, it is possible to configure such that if privilege information related to the service is not recorded in the remote controller, registration information related to the service is generated from other privilege information related to another service recorded in the remote controller, a registration request specifying the generated registration information is sent to the server related to the service to register a new account in the server, a registration response, in which privilege information related to the registered new account is specified, is received from the registered server, based on the received registration response, privilege information related to the service is recorded in association with the selected service, and the privilege information recorded in association with the service is transmitted to the server related to the service.

Additionally, in the remote control system according to the present embodiment, it is possible to configure such that the service is a virtual desktop service including a virtual desktop infrastructure (VDI) and a remote desktop service (RDS), the terminal is a computer on which a client for the virtual desktop service operates, and the server is a server for the virtual desktop service.

Additionally, in the remote control system according to the present embodiment, it is possible to configure such that the terminal is a computer on which a browser operates, the terminal waits for the instruction as a result of the browser loading a wait page from the mediation device, the browser operating on the terminal is identified by the identification information, and the request is a transition request for the browser to transition to a provision page related to the service.

A remote control system according to the present embodiment includes a mediation device; a terminal on which a browser operates; and a remote controller;

(a) the browser that operates on the terminal loading a wait page from the mediation device and, as a result, waiting for an instruction to be transmitted from the mediation device, (b) the remote controller sending, to the mediation device, identification information that identifies a browser to be controlled and a service to be received by the browser, (c) the mediation device transmitting, to the waiting browser, an instruction specifying the service identified by the sent identification information, if the browser identified by the sent identification information is waiting, and (d) the waiting browser sending, to a server related to the service specified in the transmitted instruction, a transition request for transitioning to a provision page related to the service specified in the transmitted instruction.

Additionally, in the remote control system according to the present embodiment, it is possible to configure such that the browser loads the wait page in a first window or tab of the browser, generates a second window or tab from the first window or tab, sends the transition request from the generated second window or tab, and waits for a new instruction to be transmitted from the mediation device by the wait page loaded in the first window or tab, even after provision of the service is started on the service page loaded in the second window or tab.

Additionally, in the remote control system according to the present embodiment, it is possible to configure such that when the new instruction is transmitted, if a zapping condition is satisfied in the second window or tab, the browser sends, from the second window or tab, a new transition request related to the new instruction, and if the zapping condition is not satisfied, the browser generates a third window or tab from the first window or tab, and sends the new transition request from the generated third window or tab.

Additionally, in the remote control system according to the present embodiment, it is possible to configure such that the zapping condition is satisfied from when provision of the service is started in the service page loaded in the second window or tab to when a predetermined grace time elapses.

Additionally, in the remote control system according to the present embodiment, it is possible to configure such that the zapping condition is not satisfied if another service is provided after provision of the service is started in the second window or tab.

Additionally, in the remote control system according to the present embodiment, it is possible to configure such that the zapping condition is not satisfied if an operation in the second window or tab is performed at the terminal after provision of the service has started in the second window or tab.

A remote control method according to the present embodiment for a remote control system including a mediation device, a terminal, and a remote controller, the method including:

(a) waiting, by the terminal, for an instruction to be transmitted from the mediation device;

(b) sending, by the remote controller to the mediation device, identification information that identifies a terminal to be controlled and a service to be received by the terminal;

(c) transmitting, by the mediation device to the waiting terminal, an instruction specifying the service identified by the sent identification information, if the terminal identified by the sent identification information is waiting; and (d) sending, by the waiting terminal to a server related to the service specified in the transmitted instruction, a request related to the service specified in the transmitted instruction; wherein the server provides the service after performing a confirmation that the terminal that sends the request is the terminal to be controlled.

A remote control method according to the present embodiment for a remote control system including a mediation device, a terminal on which a browser operates, and a remote controller, the method including:

(a) waiting for an instruction to be transmitted from the mediation device by the browser that operates on the terminal loading a wait page from the mediation device;

(b) sending, by the remote controller to the mediation device, identification information that identifies a browser to be controlled and a service to be received by the browser;

(c) transmitting, by the mediation device to the waiting browser, an instruction specifying the service identified by the sent identification information, if the browser identified by the sent identification information is waiting; and (d) sending, by the waiting browser to a server related to the service specified in the transmitted instruction, a transition request for transitioning to a provision page related to the service specified in the transmitted instruction.

A program according to the present embodiment includes a mediation program executed by a mediation device, a terminal program executed by a terminal, and a remote control program executed by a remote controller;

(a) the terminal program causing the terminal to execute processing for waiting for an instruction to be transmitted from the mediation device;

(b) the remote control program causing the remote controller to execute processing for sending, to the mediation device, identification information that identifies a terminal to be controlled and a service to be received by the terminal;

(c) the mediation program causing the mediation device to execute processing for transmitting, to the waiting terminal, an instruction specifying the service identified by the sent identification information if the terminal identified by the sent identification information is waiting; and (d) the terminal program causing the waiting terminal to execute processing for sending, to a server related to the service specified in the transmitted instruction, a request related to the service specified in the transmitted instruction; wherein the server provides the service after performing a confirmation that the terminal that sends the request is the terminal to be controlled.

A program according to the present embodiment includes a mediation program executed by a mediation device, a terminal program that is executed by the browser and that is distributed to a browser operating on a terminal by the browser loading a wait page from the mediation device, and a remote control program executed by a remote controller;

(a) the terminal program causing the browser operating on the terminal to execute processing for waiting for an instruction to be transmitted from the mediation device, (b) the remote control program causing the remote controller to execute processing for sending, to the mediation device, identification information that identifies a browser to be controlled and a service to be received by the browser;

(c) the mediation program causing the mediation device to execute processing for transmitting, to the waiting browser, an instruction specifying the service identified by the sent identification information, if the browser identified by the sent identification information is waiting; and (d) the terminal program causing the waiting browser to execute processing for sending, to a server related to the service specified in the transmitted instruction, a transition request for transitioning to a provision page related to the service specified in the transmitted instruction.

A non-transitory computer-readable information recording medium according to the present embodiment records the mediation program.

A non-transitory computer-readable information recording medium according to the present embodiment records the terminal program.

A non-transitory computer-readable information recording medium according to the present embodiment records the remote control program.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

According to the present disclosure, a remote control system that is suitable for controlling a terminal from a remote controller to receive the provision of a service, a remote control method, a program, and a non-transitory information recording medium can be provided.

REFERENCE SIGNS LIST

101 Remote control system
111 Mediation device
121 Terminal
131 Remote controller
171 External server
172 Confirmation device
191 Internet
201 Wait information
202 Identification information
203 Instruction
204 Request
205 Response
206 Privilege information
209 Terminal information
213 FIR
214 Answer
221 First scrambled information
222 Second scrambled information

The invention claimed is:

1. A remote control system, comprising a mediation device; a terminal; a key pair; and a remote controller;
   (a) the terminal waiting for an instruction to be transmitted from the mediation device;
   (b) the remote controller sending, to the mediation device, identification information that identifies a terminal to be controlled and a service to be received by the terminal;
   (c) the mediation device transmitting, to the waiting terminal, an instruction specifying the service identified by the sent identification information, if the terminal identified by the sent identification information is waiting; and
   (d) the waiting terminal sending, to a server related to the service specified in the transmitted instruction, a request related to the service specified in the transmitted instruction; wherein the server provides the service after performing a confirmation that the terminal that sends the request is the terminal to be controlled;
   wherein the key pair, consisting of a public key and a private key, is assigned to the terminal, terminal information is identified based on key information identifying the public key assigned to the terminal, the terminal sends the request together with an electronic signature of the private key, and by verifying the electronic signature sent together with the request using the public key related to the terminal information, a determination is made as to whether the terminal that sends the request is identified by a terminal information output to a confirmation device.

2. The remote control system according to claim 1, wherein the server performs the confirmation by querying the mediation device as to whether the terminal that sends the request is identified by the identification information sent to the mediation device.

3. The remote control system according to claim 1, wherein the remote controller outputs, to the confirmation device, terminal information identifying the terminal to be controlled, and the server performs the confirmation by querying the confirmation device as to whether the terminal that sends the request is identified by the terminal information output to the confirmation device.

4. The remote control system according to claim 1, wherein the remote controller outputs, to the server, the terminal information identifying the terminal to be controlled, and the server performs the confirmation based on whether the terminal that sends the request is identified by the outputted terminal information.

5. The remote control system according to claim 1, wherein if the key pair (p) is not recorded in the terminal the terminal communicates the key information to the mediation device to wait for the instruction, and the mediation device identifies the waiting terminal by the communicated key information, (q) is recorded in the terminal, the terminal acquires and records the key pair, and provides, to the remote controller, key information identifying the public key related to the acquired key pair.

6. The remote control system according to claim 5, wherein the terminal associates the public key related to the key pair with an identification name that identifies the terminal, and publishes the public key via a public key server, and the identification name associated with the public key is set as the key information.

7. The remote control system according to claim 5, wherein the terminal displays, on a screen, a code image obtained by converting the key information to code, and the key information is provided from the terminal to the remote controller by the remote controller performing code recognition on the code image displayed on the screen.

8. The remote control system according to claim 5, wherein when the key pair is acquired by the terminal, the mediation device temporarily records the key information in association with a temporary code, the terminal displays the temporary code on a screen, when the remote controller receives an input of a linking code obtained by a user from the temporary code displayed on the screen, the remote controller communicates the linking code to the mediation device, and the mediation device provides, to the remote controller, key information temporarily recorded in association with a temporary code that matches the communicated linking code.

9. The remote control system according to claim 1, wherein the remote controller transmits, to the server, privilege information recorded in the remote controller in association with the service, and the server provides the service to the terminal based on the transmitted privilege information.

10. The remote control system according to claim 1, wherein the remote controller includes the privilege information in the identification information, and the mediation device specifies, in the instruction, the privilege information included in the identification information and, as a result the privilege information is transmitted from the remote controller to the server via the mediation device.

11. The remote control system according to claim 9, wherein the remote controller generates first scrambled information and second scrambled information based on the privilege information, outputs the terminal information and also transmits the first scrambled information to the server, and includes the second scrambled information in the identification information to transmit the second scrambled information to the server via the mediation device, and the server recovers the privilege information from the transmitted first scrambled information and the transmitted second scrambled information.

12. The remote control system according to claim 9, wherein if privilege information related to the service is not recorded in the remote controller, registration information related to the service is generated from other privilege information related to another service recorded in the remote controller, a registration request specifying the generated registration information is sent to the server related to the service to register a new account in the server, a registration response, in which privilege information related to the registered new account is specified, is received from the registered server, based on the received registration response, privilege information related to the service is recorded in association with the selected service, and the privilege information recorded in association with the service is transmitted to the server related to the service.

13. The remote control system according to claim 1, wherein the service is a virtual desktop service including a virtual desktop infrastructure (VDI) and a remote desktop service (RDS), the terminal is a computer on which a client for the virtual desktop service operates, and the server is a server for the virtual desktop service.

14. The remote control system according to claim 1, wherein the terminal is a computer on which a browser operates, the terminal waits for the instruction as a result of the browser loading a wait page from the mediation device, the browser operating on the terminal is identified by the identification information, and the request is a transition request for the browser to transition to a provision page related to the service.

15. A remote control system comprising a mediation device, a terminal on which a browser operates, a remote controller, and a key pair;
  (a) the browser that operates on the terminal loading a wait page from the mediation device and, as a result, waiting for an instruction to be transmitted from the mediation device;
  (b) the remote controller sending, to the mediation device, identification information that identifies a browser to be controlled and a service to be received by the browser;
  (c) the mediation device transmitting, to the waiting browser, an instruction specifying the service identified by the sent identification information, if the browser identified by the sent identification information is waiting; and
  (d) the waiting browser sending, to a server related to the service specified in the transmitted instruction, a transition request for transitioning to a provision page related to the service specified in the transmitted instruction;
  wherein the key pair, consisting of a public key and a private key, is assigned to the terminal, terminal information is identified based on key information identifying the public key assigned to the terminal, the terminal sends the transition request together with an electronic signature of the private key, and by verifying the electronic signature sent together with the transition request using the public key related to the terminal information, a determination is made as to whether the terminal that sends the request is identified by the terminal information output to the confirmation device.

16. The remote control system according to claim 14, wherein the browser loads the wait page in a first window or tab of the browser, generates a second window or tab from the first window or tab, sends the transition request from the generated second window or tab, and waits for a new instruction to be transmitted from the mediation device by the wait page loaded in the first window or tab, even after provision of the service is started on the service page loaded in the second window or tab.

17. The remote control system according to claim 16, wherein when the new instruction is transmitted, if a zapping condition is satisfied in the second window or tab, the browser sends, from the second window or tab, a new transition request related to the new instruction, and if the zapping condition is not satisfied, the browser generates a third window or tab from the first window or tab, and sends the new transition request from the generated third window or tab.

18. The remote control system according to claim 17, wherein the zapping condition is satisfied from when provision of the service is started in the service page loaded in the second window or tab to when a predetermined grace time elapses.

19. The remote control system according to claim 17, wherein the zapping condition is not satisfied if another service is provided after provision of the service is started in the second window or tab.

20. The remote control system according to claim 17, wherein the zapping condition is not satisfied if an operation in the second window or tab is performed at the terminal after the provision of the service has started in the second window or tab.

21. A remote control method for a remote control system including a mediation device, a terminal, a key pair, and a remote controller, the method comprising:
 (a) waiting, by the terminal, for an instruction to be transmitted from the mediation device;
 (b) sending, by the remote controller to the mediation device, identification information that identifies a terminal to be controlled and a service to be received by the terminal;
 (c) transmitting, by the mediation device to the waiting terminal, an instruction specifying the service identified by the sent identification information, if the terminal identified by the sent identification information is waiting; and
 (d) sending, by the waiting terminal to a server related to the service specified in the transmitted instruction, a request related to the service specified in the transmitted instruction; wherein the server provides the service after performing a confirmation that the terminal that sends the request is the terminal to be controlled;
 wherein the key pair, consisting of a public key and a private key, is assigned to the terminal, terminal information is identified based on key information identifying the public key assigned to the terminal, the terminal sends the request together with an electronic signature of the private key, and by verifying the electronic signature sent together with the request using the public key related to the terminal information, a determination is made as to whether the terminal that sends the request is identified by a terminal information output to a confirmation device.

22. A remote control method for a remote control system including a mediation device, a terminal on which a browser operates, a key pair, and a remote controller, the method comprising:
 (a) waiting for an instruction to be transmitted from the mediation device by the browser that operates on the terminal loading a wait page from the mediation device;
 (b) sending, by the remote controller to the mediation device, identification information that identifies a browser to be controlled and a service to be received by the browser;
 (c) transmitting, by the mediation device to the waiting browser, an instruction specifying the service identified by the sent identification information if the browser identified by the sent identification information is waiting; and
 (d) sending, by the waiting browser to a server related to the service specified in the transmitted instruction, a transition request for transitioning to a provision page related to the service specified in the transmitted instruction;
 wherein the key pair, consisting of a public key and a private key, is assigned to the terminal, terminal information is identified based on key information identifying the public key assigned to the terminal, the terminal sends the transition request together with an electronic signature of the private key, and by verifying the electronic signature sent together with the transition request using the public key related to the terminal information, a determination is made as to whether the terminal that sends the request is identified by a terminal information output to a confirmation device.

23. A non-transitory computer-readable information recording medium storing at least one of a mediation program executed by a mediation device, a terminal program executed by a terminal, a key pair, and a remote control program executed by a remote controller;
 (a) the terminal program causing the terminal to execute processing for waiting for an instruction to be transmitted from the mediation device;
 (b) the remote control program causing the remote controller to execute processing for sending, to the mediation device, identification information that identifies a terminal to be controlled and a service to be received by the terminal;
 (c) the mediation program causing the mediation device to execute processing for transmitting, to the waiting terminal, an instruction specifying the service identified by the sent identification information, if the terminal identified by the sent identification information is waiting; and
 (d) the terminal program causing the waiting terminal to execute processing for sending, to a server related to the service specified in the transmitted instruction, a request related to the service specified in the transmitted instruction, wherein the server provides the service after performing a confirmation that the terminal that sends the request is the terminal to be controlled;
 wherein the key pair, consisting of a public key and a private key, is assigned to the terminal, terminal information is identified based on key information identifying the public key assigned to the terminal, the terminal sends the request together with an electronic signature of the private key, and by verifying the electronic signature sent together with the request using the public key related to the terminal information, a determination is made as to whether the terminal that sends the request is identified by a terminal information output to a confirmation device.

24. A non-transitory computer-readable information recording medium storing at least one of a mediation program executed by a mediation device, a terminal program that is executed by the browser and that is distributed to a browser operating on a terminal by the browser loading a wait page from the mediation device, a key pair, and a remote control program executed by a remote controller;
 (a) the terminal program causing the browser operating on the terminal to execute processing for waiting for an instruction to be transmitted from the mediation device;

(b) the remote control program causing the remote controller to execute processing for sending, to the mediation device, identification information that identifies a browser to be controlled and a service to be received by the browser;
(c) the mediation program causing the mediation device to execute processing for transmitting, to the waiting browser, an instruction specifying the service identified by the sent identification information, if the browser identified by the sent identification information is waiting; and
(d) the terminal program causing the waiting browser to execute processing for sending, to a server related to the service specified in the transmitted instruction, a transition request for transitioning to a provision page related to the service specified in the transmitted instruction;
wherein the key pair, consisting of a public key and a private key, is assigned to the terminal, terminal information is identified based on key information identifying the public key assigned to the terminal, the terminal sends the request together with an electronic signature of the private key, and by verifying the electronic signature sent together with the request using the public key related to the terminal information, a determination is made as to whether the terminal that sends the request is identified by a terminal information output to a confirmation device.

* * * * *